United States Patent
Larsson et al.

(10) Patent No.: US 10,129,880 B2
(45) Date of Patent: Nov. 13, 2018

(54) AGGREGATION GROUPS FOR AGGREGATING HETEROGENEOUS CARRIERS

(71) Applicant: Telefonaktiebolaget LM Ericsson (publ), Stockholm (SE)

(72) Inventors: Daniel Larsson, Stockholm (SE); Xinghua Song, Beijing (CN); Jung-Fu Cheng, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 134 days.

(21) Appl. No.: 15/024,329

(22) PCT Filed: Feb. 4, 2014

(86) PCT No.: PCT/SE2014/050139
§ 371 (c)(1),
(2) Date: Mar. 23, 2016

(87) PCT Pub. No.: WO2015/047149
PCT Pub. Date: Apr. 2, 2015

(65) Prior Publication Data
US 2016/0219595 A1    Jul. 28, 2016

Related U.S. Application Data

(60) Provisional application No. 61/883,777, filed on Sep. 27, 2013.

(51) Int. Cl.
*H04W 72/04* (2009.01)
*H04L 5/00* (2006.01)
(Continued)

(52) U.S. Cl.
CPC ....... *H04W 72/0453* (2013.01); *H04L 1/1812* (2013.01); *H04L 5/001* (2013.01);
(Continued)

(58) Field of Classification Search
CPC ......... H04W 72/0453; H04W 74/0833; H04W 72/0413; H04W 72/042; H04L 5/14;
(Continued)

(56) References Cited

U.S. PATENT DOCUMENTS

2013/0176953 A1* 7/2013 Stern-Berkowitz .......... H04W 52/146
370/329
2013/0250881 A1   9/2013 Liao et al.
(Continued)

FOREIGN PATENT DOCUMENTS

CN  102378225 A   3/2012
EP  2 448 157 A2  5/2012

OTHER PUBLICATIONS

International Search Report, Application No. PCT/SE2014/050139, dated Oct. 9, 2014.
(Continued)

*Primary Examiner* — Pao Sinkantarakorn
*Assistant Examiner* — Kabir U Jahangir
(74) *Attorney, Agent, or Firm* — Patent Portfolio Builders, PLLC

(57) ABSTRACT

A network node provides cells serving uplink (UL) and downlink (DL) resources for wireless communications between the network node and a user equipment node (UE). The network node forms a primary aggregation group of cells that contains a primary cell (PCell) and operates the UL and DL resources of the PCell in the primary aggregation group to communicate with the UE. The network node configures the UE to connect to a serving cell, and assigns the serving cell to a secondary aggregation group of cells. The network node sets up the UL and downlink resources of the serving cell as a group PCell in the secondary aggregation group for communication with the UE. Related user equipment and methods by network nodes and user equipment are disclosed.

32 Claims, 20 Drawing Sheets

(51) Int. Cl.
*H04L 1/18* (2006.01)
*H04L 5/14* (2006.01)
*H04W 74/08* (2009.01)

(52) U.S. Cl.
CPC .......... *H04L 5/0016* (2013.01); *H04L 5/0037* (2013.01); *H04L 5/0044* (2013.01); *H04L 5/14* (2013.01); *H04W 72/0413* (2013.01); *H04W 74/0833* (2013.01); *H04W 72/042* (2013.01)

(58) Field of Classification Search
CPC ..... H04L 1/1812; H04L 5/001; H04L 5/0044; H04L 5/0037; H04L 5/0016
See application file for complete search history.

(56) References Cited

U.S. PATENT DOCUMENTS

| | | | | |
|---|---|---|---|---|
| 2014/0010139 | A1* | 1/2014 | Choi | H04W 4/06 370/312 |
| 2014/0274030 | A1* | 9/2014 | Aminzadeh | H04W 52/0238 455/424 |
| 2016/0164622 | A1* | 6/2016 | Yi | H04B 7/2656 370/280 |

OTHER PUBLICATIONS

Written Opinion of the International Searching Authority, Application No. PCT/SE2014/050139, dated Oct. 9, 2014.

3GPP, Technical Specification—"3rd Generation Partnership Project; Technical Specification Group Radio Access Network; Evolved Universal Terrestrial Radio Access (E-UTRA); Physical Channels and Modulation (Release 11)", 3GPP TS 36.211 V11.1.0 (Dec. 2012), 108 pp.

3GPP, Technical Specification—"3rd Generation Partnership Project; Technical Specification Group Radio Access Network; Evolved Universal Terrestrial Radio Access (E-UTRA); Physical layer procedures (Release 11)", 3GPP TS 36.213 V11.1.0 (Dec. 2012), 160 pp.

Rapporteur (Samsung), "Introduction of Carrier Aggregation", Change Request, 3GPP TSG-RAN WG2 Meeting #71, R2-104516, Madrid, Spain, Aug. 23-27, 2010, 74 pages.

* cited by examiner (LTE Downlink Physical Resource)

(LTE Time-Domain Structure)

(Downlink Subframe)

(Processing Procedures for PDCCHs)

(Illustration of Common and UE-Specific Search Spaces for Two UEs)

(Uplink L1/L2 Control Signaling Transmission on Rel-8 PUCCH)

Aggregated bandwidth of 100 MHz (Carrier Aggregation)

(DFT-S-OFDM Based PUCCH Format 3 for UE Supporting More Than 4 HARQ Bits in Normal CP Subframes)

(Mapping of Format 1b With Channel Selection for 2 A/N Bits)

(Mapping of Format 1b With Channel Selection for 3 A/N Bits)

(Mapping of Format 1b With Channel Selection for 4 A/N Bits)

(Frequency- and Time-
Division Duplex)

FDD  Half-duplex FDD  TDD
(terminal-side only)

(Uplink/downlink time/frequency
structure for LTE in case of FDD
and TDD)

(UL-DL interference in TDD)

(Carrier aggregation of TDD cells with different U/D configurations)

(PDSCH A/N feedback timings for a configuration 1 cell and a configuration 2 cell)

(PDSCH A/N feedback timings for aggregation of a configuration 1 cell)

(PDSCH A/N feedback timings for aggregation of a configuration 2 cell)

(Dual connectivity to anchor and booster cells)

AGGREGATION GROUPS FOR AGGREGATING HETEROGENEOUS CARRIERS

CROSS REFERENCE TO RELATED APPLICATION

This application is a 35 U.S.C. § 371 national stage application of PCT International Application No. PCT/SE2014/050139, filed on Feb. 4, 2014, which itself claims priority to U.S. provisional Application No. 61/883,777, filed Sep. 27, 2013, the disclosure and content of both of which are incorporated by reference herein in their entireties. The above-referenced PCT International Application was published in the English language as International Publication No. WO 2015/047149 A1 on Apr. 2, 2015.

TECHNICAL FIELD

The present invention relates to wireless communication networks and in particular to the aggregation of carrier frequencies for use by wireless communication networks.

BACKGROUND

Technical Background

The 3$^{rd}$ Generation Partnership Project (3GPP) Long Term Evolution (LTE) communication networks use Orthogonal Frequency Division Multiplex (OFDM) in the downlink and Discrete Fourier Transformation (DFT)-spread OFDM in the uplink. The basic LTE downlink physical resource can thus be seen as a time-frequency grid as illustrated in FIG. 1 (illustrating one OFDM symbol including cyclic prefix), where each resource element corresponds to one OFDM subcarrier during one OFDM symbol interval.

In the time domain, LTE downlink transmissions are organized into radio frames of 10 ms, each radio frame consisting of ten equally-sized subframes of length Tsubframe=1 ms, as shown in the FIG. 2 (illustrating a LTE time-domain structure).

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

The notion of virtual resource blocks (VRB) and physical resource blocks (PRB) has been introduced in LTE. The actual resource allocation to a user equipment node (UE), e.g., a cellular terminal, is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain, thereby providing frequency diversity for data channel transmitted using these distributed VRBs.

Downlink transmissions are dynamically scheduled, i.e., in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3 (illustrating a downlink subframe).

From LTE Re-11 onwards above described resource assignments can also be scheduled on the enhanced Physical Downlink Control Channel (EPDCCH). For Rel-8 to Rel-10 only Physical Downlink Control Channel (PDCCH) is available.

PDCCH

The PDCCH is used to carry downlink control information (DCI) such as scheduling decisions and power-control commands. More specifically, the DCI includes:

Downlink scheduling assignments, including Physical Downlink Shared Channel (PDSCH) resource indication, transport format, hybrid-Automatic Repeat reQuest (ARQ) information, and control information related to spatial multiplexing (if applicable). A downlink scheduling assignment also includes a command for power control of the Physical Uplink Control Channel (PUCCH) used for transmission of hybrid-ARQ acknowledgements in response to downlink scheduling assignments.

Uplink scheduling grants, including Physical Uplink Shared Channel (PUSCH) resource indication, transport format, and hybrid-ARQ-related information. An uplink scheduling grant also includes a command for power control of the PUSCH.

Power-control commands for a set of terminals as a complement to the commands included in the scheduling assignments/grants.

One PDCCH carries one DCI message with one of the formats above. As multiple terminals can be scheduled simultaneously, on both downlink and uplink, there must be a possibility to transmit multiple scheduling messages within each subframe. Each scheduling message is transmitted on a separate PDCCH, and consequently there are typically multiple simultaneous PDCCH transmissions within each cell. Furthermore, to support different radio-channel conditions, link adaptation can be used, where the code rate of the PDCCH is selected to match the radio-channel conditions.

To allow for simple yet efficient processing of the control channels in the terminal, the mapping of PDCCHs to resource elements is subject to a certain structure. This structure is based on Control-Channel Elements (CCEs), which consists of nine Resource Element Groups (REGs). The number of CCEs, one, two, four, or eight, required for a certain PDCCH depends on the payload size of the control information (DCI payload) and the channel-coding rate. This is used to realize link adaptation for the PDCCH; if the channel conditions for the terminal to which the PDCCH is intended are disadvantageous, a larger number of CCEs needs to be used compared to the case of advantageous channel conditions. The number of CCEs used for a PDCCH is also referred to as the aggregation level (AL).

The network can then select different aggregation levels and PDCCH positions for different UEs from the available PDCCH resources. For each PDCCH, as illustrated in FIG. 4 (processing procedures for PDCCHs), a Cyclic Redundancy Check (CRC) is attached to each DCI message payload. The identity of the terminal (or terminals) addressed—that is, the radio network temporary identifier (RNTI)—is included in the CRC calculation and not explicitly transmitted. Depending on the purpose of the DCI message (unicast data transmission, power-control command, random-access response, etc.), different RNTIs are used; for normal unicast data transmission, the terminal-specific C-RNTI is used. After CRC attachment, the bits are coded with a rate-1/3 tail-biting convolutional code and rate matched to fit the amount of resources used for PDCCH transmission. After the PDCCHs to be transmitted in a given subframe have been allocated to the desired resource elements (the details of which are given below), the sequence of bits corresponding to all the PDCCH resource elements to be transmitted in the subframe, including the unused resource elements, is scrambled by a cell- and subframe-specific scrambling sequence to randomize inter-cell interference, followed by QPSK modulation and mapping to resource elements. The entire collection of the REGs (including those unused by any PDCCH) is then interleaved across entire control region to randomize inter-cell interference as well as capturing frequency diversity for the PDCCHs.

PDCCH Search Space

LTE defines so-called search spaces, which describe the set of CCEs the RNTI terminal is supposed to monitor for scheduling assignments/grants relating to a certain component carrier. A search space is a set of candidate control channels formed by CCEs on a given aggregation level, which the terminal is supposed to attempt to decode. As there are multiple aggregation levels, corresponding to one, two, four, and eight CCEs, a terminal has multiple search spaces. In each subframe, the terminals will attempt to decode all the PDCCHs that can be formed from the CCEs in each of its search spaces. If the Cyclic Redundancy Check (CRC) is properly validated during the decoding, the content of the control channel is declared as valid for this terminal and the terminal processes the information (scheduling assignment, scheduling grants, etc.). Each terminal in the system therefore has a terminal-specific search space at each aggregation level.

In several situations, there is a need to address a group of, or all, terminals in the system. To allow all terminals to be addressed at the same time, LTE has defined common search spaces in addition to the terminal-specific search spaces. A common search space is, as the name implies, common, and all terminals in the cell monitor the CCEs in the common search spaces for control information. Although the motivation for the common search space is primarily transmission of various system messages, it can be used to schedule individual terminals as well. Thus, it can be used to resolve situations where scheduling of one terminal is blocked due to lack of available resources in the terminal-specific search space. More important, the common search space is not dependent of UE configuration status. Therefore, the common search space can be used when the network needs to communicate with the UE during UE reconfiguration periods. FIG. 5 illustrates common and UE-specific search spaces for two UEs.

PUCCH

If the mobile terminal has not been assigned an uplink resource for data transmission, the L1/L2 control information (channel-status reports, hybrid-ARQ acknowledgments, and scheduling requests) is transmitted in uplink resources (resource blocks) specifically assigned for uplink L1/L2 control on Rel-8 Physical Uplink Control Channel (PUCCH). As illustrated in FIG. 6 (uplink L1/L2 control signaling transmission on Rel-8 PUCCH), these resources are located at the edges of the total available cell bandwidth. Each such resource consists of 12 "subcarriers" (one resource block) within each of the two slots of an uplink subframe. In order to provide frequency diversity, these frequency resources are frequency hopping on the slot boundary, i.e. one "resource" consists of 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g. in case of very large overall transmission bandwidth supporting a large number of users, additional resources blocks can be assigned next to the previously assigned resource blocks.

Carrier Aggregation

The LTE Rel-10 standard has recently been standardized, supporting bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least the possibility to have, the same structure as a Rel-8 carrier. CA is illustrated in FIG. 7 for an aggregated bandwidth of 100 MHz.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

During initial access a LTE Rel-10 terminal behaves similar to a LTE Rel-8 terminal. Upon successful connection to the network a terminal may—depending on its own capabilities and the network—be configured with additional CCs in the uplink (UL) and downlink (DL). Configuration is based on Radio Resource Control (RRC) signaling. Due to the heavy signaling and rather slow speed of RRC signaling it is envisioned that a terminal may be configured with multiple CCs even though not all of them are currently used. If a terminal is configured on multiple CCs this would imply it has to monitor all DL CCs for Physical Downlink Control Channel (PDCCH) and Physical Downlink Shared Channel (PDSCH). This implies a wider receiver bandwidth, higher sampling rates, etc. resulting in high power consumption.

To mitigate the above problems, LTE Rel-10 supports activation of CCs on top of configuration. The terminal monitors only configured and activated CCs for PDCCH and PDSCH. Since activation is based on Medium Access Control (MAC) control elements—which are faster than RRC signaling—activation/de-activation can follow the number of CCs that is required to fulfill the current data rate needs. Upon arrival of large data amounts multiple CCs are activated, used for data transmission, and de-activated if not needed anymore. All but one CC—the DL Primary CC (DL PCC)—can be de-activated. Activation provides therefore the possibility to configure multiple CC but only activate them on a need basis. Most of the time a terminal would have one or very few CCs activated resulting in a lower reception bandwidth and thus battery consumption.

Scheduling of a CC is done on the PDCCH via downlink assignments. Control information on the PDCCH is formatted as a Downlink Control Information (DCI) message. In Rel-8 a terminal only operates with one DL and one UL CC, the association between DL assignment, UL grants and the corresponding DL and UL CCs is therefore clear. In Rel-10 two modes of CA needs to be distinguished: The first case is very similar to the operation of multiple Rel-8 terminals, a DL assignment or UL grant contained in a DCI message transmitted on a CC is either valid for the DL CC itself or for associated (either via cell-specific or UE specific linking) UL CC. A second mode of operation augments a DCI message with the Carrier Indicator Field (CIF). A DCI containing a DL assignment with CIF is valid for that DL CC indicted with CIF and a DCI containing an UL grant with CIF is valid for the indicated UL CC.

DCI messages for downlink assignments contain among others resource block assignment, modulation and coding scheme related parameters, Hybrid Automatic Repeat Request (HARQ) redundancy version, etc. In addition to those parameters that relate to the actual downlink transmission most DCI formats for downlink assignments also contain a bit field for Transmit Power Control (TPC) commands. These TPC commands are used to control the uplink power control behavior of the corresponding PUCCH that is used to transmit the HARQ feedback.

In Rel-10 LTE, the transmission of PUCCH is mapped onto one specific uplink CC, the UL Primary CC (UL PCC). Terminals only configured with a single DL CC (which is then the DL PCC) and UL CC (which is then the UL PCC) are operating dynamic ACK/NACK on PUCCH according to Rel-8. The first Control Channel Element (CCE) used to transmit PDCCH for the DL assignment determines the dynamic ACK/NACK resource on Rel-8 PUCCH. Since only one DL CC is cell-specifically linked with the UL PCC no PUCCH collisions can occur since all PDCCH are transmitted using different first CCE.

Upon reception of DL assignments on a single Secondary CC (SCC) or reception of multiple DL assignments, CA PUCCH should be used. A DL SCC assignment alone is untypical. The eNB scheduler should strive to schedule a single DL CC assignment on the DL PCC and try to de-activate SCCs if not needed. A possible scenario that may occur is that eNB schedules terminal on multiple DL CCs including the PCC. If the terminal misses all but the DL PCC assignment it will use Rel-8 PUCCH instead of CA PUCCH. To detect this error case eNB has to monitor both the Rel-8 PUCCH and the CA PUCCH.

In Rel-10 LTE, the CA PUCCH format is based on the number of configured CC. Configuration of CC is based on Radio Resource Control (RRC) signaling. After successful reception/application of the new configuration a confirmation message is sent back making RRC signaling very safe.

CA PUCCH Transmission Scheme

The CA PUCCH can be performed according to two alternative methods. The first method is based on the use of PUCCH format 3 that is based on DFTS-OFDM. FIG. 8 shows a block diagram of that design (only one slot is shown), illustrating DFTS-OFDM based PUCCH Format 3 for UE supporting more than 4 HARQ bits in normal CP subframes. The multiple ACK/NACK bits are encoded to form 48 coded bits. The coded bits are then scrambled with cell-specific (and possibly DFTS-OFDM symbol dependent) sequences. 24 bits are transmitted within the first slot and the other 24 bits are transmitted within the second slot. The 24 bits per slot are converted into 12 QPSK symbols, DFT precoded, spread across five DFTS-OFDM symbols and transmitted within one resource blocks (bandwidth) and five DFTS-OFDM symbols (time). The spreading sequence oc is UE specific and enables multiplexing of up to five users within the same resource blocks.

For the reference signals cyclic shifted CAZAC sequences, e.g. the computer optimized sequences in LTE can be used.

The second CA PUCCH method is called channel selection. The basic principle is that the UE is assigned a set of PUCCH format 1a/1b resources. The UE then selects one of resources according to the ACK/NACK sequence the UE should transmit. On one of the assigned resources the UE would then transmit a QPSK or BPSK value. The eNB detect which resource the UE uses and which QPSK or BPSK value the UE fed back on the used resource and combines this into a HARQ response for associated DL cells. The mapping of ACK (A), NACK (N) and Discontinuous Transmission (DTX) (D) can be performed according to FIG. 9 (illustrating mapping of format 1b with channel selection for 2 A/N bits), FIG. 10 (illustrating mapping of format 1b with channel selection for 3 A/N bits), and/or FIG. 11 (illustrating mapping of format 1b with channel selection for 4 A/N bits) for FDD. A similar type of mapping including a bundling approach is also done for TDD in case the UE is configured with channel selection.

Time Division Duplex:

Transmission and reception from a node, e.g. a terminal in a cellular system such as LTE, can be multiplexed in the frequency domain or in the time domain (or combinations thereof). Frequency Division Duplex (FDD) as illustrated to the left in FIG. 12 (illustrating frequency- and time-division duplex) implies that downlink and uplink transmission take place in different, sufficiently separated, frequency bands. Time Division Duplex (TDD), as illustrated to the right in FIG. 12, implies that downlink and uplink transmission take place in different, non-overlapping time slots. Thus, TDD can operate in unpaired spectrum, whereas FDD requires paired spectrum.

Typically, the structure of the transmitted signal in a communication system is organized in the form of a frame structure. For example, LTE uses ten equally-sized subframes of length 1 ms per radio frame as illustrated in FIG. 13 (illustrating uplink/downlink time/frequency structure for LTE in case of FDD and TDD).

In case of FDD operation (upper part of FIG. 13), there are two carrier frequencies, one for uplink transmission ($f_{UL}$) and one for downlink transmission ($f_{DL}$). At least with respect to the terminal in a cellular communication system, FDD can be either full duplex or half duplex. In the full duplex case, a terminal can transmit and receive simultaneously, while in half-duplex operation, the terminal cannot transmit and receive simultaneously (the base station is capable of simultaneous reception/transmission though, e.g. receiving from one terminal while simultaneously transmitting to another terminal). In LTE, a half-duplex terminal is monitoring/receiving in the downlink except when explicitly being instructed to transmit in a certain subframe.

In case of TDD operation (lower part of FIG. 13), there is only a single carrier frequency and uplink and downlink transmissions are always separated in time also on a cell basis. As the same carrier frequency is used for uplink and downlink transmission, both the base station and the mobile terminals need to switch from transmission to reception and vice versa. An essential aspect of any TDD system is to provide the possibility for a sufficiently large guard time where neither downlink nor uplink transmissions occur. This is required to avoid interference between uplink and downlink transmissions. For LTE, this guard time is provided by special subframes (subframe 1 and, in some cases, subframe 6), which are split into three parts: a downlink part (DwPTS), a guard period (GP), and an uplink part (UpPTS). The remaining subframes are either allocated to uplink or downlink transmission.

TDD allows for different asymmetries in terms of the amount of resources allocated for uplink and downlink transmission, respectively, by means of different downlink/uplink configurations. In LTE, there are seven different configurations as shown in FIG. 14 (illustrating different downlink/uplink configurations in case of TDD). Note that in the description below, DL subframe can mean either DL or the special subframe.

To avoid severe interference between downlink and uplink transmissions between different cells, neighbor cells should have the same downlink/uplink configuration. If this is not done, uplink transmission in one cell may interfere with downlink transmission in the neighboring cell (and vice versa) as illustrated in FIG. 15 (illustrating UL-DL interference in TDD between Cell 1 provided by network node 1500a and Cell 2 provided by another network node 1500b). Hence, the downlink/uplink asymmetry can typically not vary between cells, but is signaled as part of the system information and remains fixed for a long period of time.

TDD HARQ Control Timing

The timings for HARQ A/N feedbacks for the Physical Downlink Shared Channel (PDSCH) are specified with extensive tables and procedure descriptions for each U/D configurations in LTE Specs 3GPP TS 36.213 V11.1.0 3rd Generation Partnership Project; Technical Specification Group Radio Access Network; Evolved Universal Terrestrial Radio Access (E-UTRA); Physical layer procedures (Release 11).

The UE shall also feed back PDSCH decoding A/N information in pre-defined UL subframes. The UE shall transmit such HARQ A/N response on the PUCCH in UL subframe n if there is PDSCH transmission indicated by the detection of corresponding PDCCH or there is PDCCH indicating downlink SPS release within subframe(s) n−k, where k is within the association set K={$k_0, k_1 \ldots, k_{M-1}$} listed in Table 1.

TABLE 1

Downlink association set index K = {$k_0, k_1, \ldots, k_{M-1}$} for TDD

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

Examples to illustrate the timing are in reference to FIG. 17.

For the UL subframe 7 in the configuration 1 cell, Table 1 shows K={7,6}, which corresponding to carrying possible HARQ A/N feedbacks for PDSCHs transmitted in subframes 7−7=0 and 7−6=1. This is illustrated as arrows from DL subframes 0 and 1 to the UL subframe 7 in FIG. 17 (top), Configuration #1.

Similarly, for the UL subframe 2 in the configuration 2 cell, Table 1 shows K={8,7,4,6}, which corresponding to carrying possible HARQ A/N feedbacks for PDSCHs transmitted in subframes 4, 5, 6, and 8 of the preceding frame. This is illustrated as arrows from these DL subframes to the UL subframe 2 in FIG. 17 (bottom), Configuration #2.

TDD PUCCH Resources

There are generally two pools of PUCCH resources available to transmit HARQ A/N feedbacks for PDSCH transmissions, dynamic PUCCH resources and static PUCCH resources.

Dynamic PUCCH Resources

For a PDSCH transmission indicated by the detection of a corresponding PDCCH in subframe n−$k_m$, where $k_m \in K$, on the primary cell, or for a PDCCH indicating downlink SPS release (defined in) in subframe n−$k_m$, where $k_m \in K$ on the primary cell, the PUCCH resource is determined by the number of the first CCE used for transmission of the corresponding DCI assignment (which is denoted by $n_{CCE,m}$ in the in LTE Specs TS.36.213, see also illustrations in FIG. 4 and FIG. 5).

Static PUCCH Resources

For a PDSCH transmission on the primary cell where there is not a corresponding PDCCH detected within subframe(s) n−k, where k∈K, the PUCCH resources are determined according to higher layer configuration.

For a PDSCH transmission indicated by the detection of a corresponding PDCCH within subframe(s) n−k, where k∈K, on the secondary cell, the PUCCH resources are selected from a PUCCH resource pool determined according to higher layer configuration. The TPC field in the DCI format of the corresponding PDCCH shall be used to determine the PUCCH resource values from PUCCH resource pool configured by higher layers.

Interband TDD Carrier Aggregation with Different UL-DL Configurations on Different Carriers In Rel-10, carrier aggregation of TDD cells is specified with the restriction that the uplink/downlink (U/D) configurations for all the aggregated cells are identical. The need to allow more flexible carrier aggregation of TDD cells is to be addressed in Rel-11 of LTE.

As discussed above, the U/D configurations of neighboring cells need to be compatible to avoid severe interference problems. However, there are cases where the neighboring cells are operated by different operators or different wireless systems. The LTE TDD cells adjacent to those neighboring systems are hence required to adopt certain compatible U/D configurations, such as different carrier aggregations of TDD cells. As a result, an operator may have several TDD cells having different U/D configurations on different frequencies as illustrated in FIG. 16.

To solve the HARQ control and A/N feedback timings in carrier aggregation systems with cells of different UL-DL configurations, a UE may be configured with at least one of these following two timing configuration numbers:

A PDSCH HARQ control timing configuration number for determining PDSCH HARQ A/N timings across all aggregated cells; and A Physical Uplink Shared Channel (PUSCH) control timing configuration number for determining PUSCH scheduling and the corresponding HARQ A/N timings on Physical hybrid-ARQ indicator channel (PHICH) across all aggregated cells.

As an example to illustrate the solution, consider PDSCH A/N feedback timing for a configuration 1 cell and a configuration 2 cell shown in FIG. 17. For UE configured with these two serving cells, the DL HARQ control timing configuration number can be set to 2. The PDSCH A/N feedback timings for such a UE is shown in FIGS. 18a and 18b. FIG. 18a illustrates PDSCH A/N feedback timings for aggregation of a configuration 1 type cell. In contrast, FIG. 18b illustrates PDSCH A/N feedback timings for aggregation of a configuration 2 type cell.

Rel-12 Dual Connectivity Framework

A dual connectivity framework is currently being considered for LTE Rel-12. Referring to FIG. 19 (illustrating dual connectivity to anchor and booster cells), a UE 2100 in dual connectivity maintains simultaneous connections to an anchor network node 2200a and a booster node 2200b. As the name implies, the anchor node 2200a terminates the control plane connection towards the UE 2100 and is thus the controlling node of the UE 2100. The UE 2100 also reads system information from the anchor node 2200a. In addition to the anchor node 2200a, the UE 2100 may be connected to one or several booster nodes 2200b for added user plane support.

Which of a plurality of network nodes serves as anchor and booster roles can be defined from a UE 2100 point of view. This means that a network node that acts as an anchor to one UE 2100 may act as booster to another UE 2100. Similarly, though the UE 2100 reads the system information from the anchor node 2200a, a network node acting as a booster to one UE 2100, may or may not distribute system information to another UE 2100.

The anchor node 2200a may provide one or more of the following operations:

Provide system information

Terminate control plane

Can terminate user plane

The booster node 2200b may provide the following operation:

Terminate only user plane

Although the anchor node 2200a is illustrated in FIG. 19 as providing a larger size cell than the booster node 2200b (e.g., macro node and pico node), embodiments disclosed herein are not limited thereto as the respective cells may be any size relative to one another.

In one application, dual connectivity allows a UE 2100 to connect to two network nodes 2200a and 2200b to receive data from both network nodes 2200a and 2200b to increase its available UL and/or DL communication data rate. This user plane aggregation achieves similar benefits as carrier aggregation using network nodes that are not connected by low-latency backhaul/network connection. Due to this lack of low-latency backhaul/network connection, the scheduling and HARQ-ACK feedback from the UE 2100 to each of the network nodes 2200a and 2200b will need to be performed separately. That is, it's expected the UE 2100 shall have two UL transmitters to transmit UL control and data to the connected network nodes 2200a and 2200b.

The approaches described in this Background section could be pursued, but are not necessarily approaches that have been previously conceived or pursued. Therefore, unless otherwise expressly and unambiguously stated herein, the approaches described in this Background section are not prior art to the claims in this application and are not admitted to be prior art by inclusion in this section.

SUMMARY

It is an object of at least some embodiments to enable a UE to simultaneously operate with a plurality of carrier aggregation groups having different radio access technologies, such as frequency division duplex (FDD) and time division duplex (TDD), and/or where the carrier aggregation groups are provided by different network nodes having excessively slow latency backhaul/network connections therebetween.

A potential advantage of methods, network nodes, and wireless communication devices such as UEs disclosed herein is that cells are aggregated into disjoint (e.g., separately managed) aggregation groups. Operations within one of the aggregation groups can be carried out separately from operations within another one of the aggregation groups. Thus, although two or more of the aggregation groups may use different radio access technologies for communications (e.g., FDD, TDD, etc.) and/or be provided by different network nodes having excessively slow latency backhaul/network connections therebetween, the operations within any one of the aggregation groups can be performed without being affected by different operations being performed within another one of the aggregation groups. According to various embodiments disclosed herein, one or more network nodes can operate to partition cells into relatively independently operating aggregation groups to simplify implementation complexity for support of various combinations of the above disclosed carrier aggregation and dual connectivity scenarios.

One embodiment is directed to a method by a network node for providing cells serving uplink (UL) and downlink (DL) resources for wireless communications between the network node and a user equipment node (UE). The method includes forming a primary aggregation group of cells that contains a primary cell (PCell). The UL and DL resources of the PCell in the primary aggregation group are operated to communicate with the UE. The UE is configured to connect to a serving cell. The serving cell is assigned to a secondary aggregation group of cells, and the UL and downlink resources of the serving cell are setup as a group PCell in the secondary aggregation group for communication with the UE.

Another corresponding embodiment is directed to a method by a UE that communicates using UL and DL resources of cells provided by at least one network node. The method includes monitoring paging and system information broadcast on a primary cell, PCell, of a primary aggregation group of the cells, and monitoring paging and/or system information broadcast on a group PCell of each of one or more secondary aggregation groups of the cells.

Another corresponding embodiment is directed to a network node that provides cells serving UL and DL resources for wireless communications between the network node and a UE. The network node includes at least one processor and at least one memory. The at least one memory is coupled to the at least one processor and includes computer readable program code that when executed by the at least one processor causes the at least one processor to perform operations that include forming a primary aggregation group of cells that contains a PCell, and operating the UL and DL resources of the PCell in the primary aggregation group to communicate with the UE. The operations further include configuring the UE to connect to a serving cell, assigning the serving cell to a secondary aggregation group of cells, and setting up the UL and downlink resources of the serving cell as a group PCell in the secondary aggregation group for communication with the UE.

Still another corresponding embodiment is directed a user equipment node (UE) that communicates using UL and DL resources of cells provided by at least one network node. The UE includes at least one processor and at least one memory. The at least one memory is coupled to the at least one processor and includes computer readable program code that when executed by the at least one processor causes the at least one processor to perform operations that include monitoring paging and system information broadcast on a PCell of a primary aggregation group of the cells, and monitoring paging and/or system information broadcast on a group PCell of each of one or more secondary aggregation groups of the cells.

BRIEF DESCRIPTION OF THE DRAWINGS

Aspects of the present disclosure are illustrated by way of example and are not limited by the accompanying drawings. In the drawings.

DETAILED DESCRIPTION

In the following detailed description, numerous specific details are set forth in order to provide a thorough understanding of embodiments of the invention. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Some embodiments of the present disclosure may arise from the present realization that there is no systematic solution for addressing various combinations of the above carrier aggregation and dual connectivity scenarios, such as when:

A UE connects to two network nodes where one of the network nodes provides both FDD and TDD carriers for communications with the UE; and/or A UE connects to three network nodes where there is no low-latency connection between the network nodes to support sufficiently fast exchange of information between the network nodes to enable efficient control of communications with the UE.

Potential Advantages of Various Embodiments Disclosed Herein

Various embodiments disclosed herein address various combinations of the above carrier aggregation and dual connectivity scenarios based on a unified framework of aggregation groups. Under this framework, the network nodes provide aggregated/connected cells that are configured into disjoint (e.g., separately managed) aggregation groups. The aggregation group configuration allows the aggregation operations within an aggregation group to follow existing LTE specifications and procedures. This aggregation group configuration allows one or more network nodes to operate to partition the cells into relatively independent operations to simplify implementation complexity in support of the various combinations of the above carrier aggregation and dual connectivity scenarios.

Figure 1:
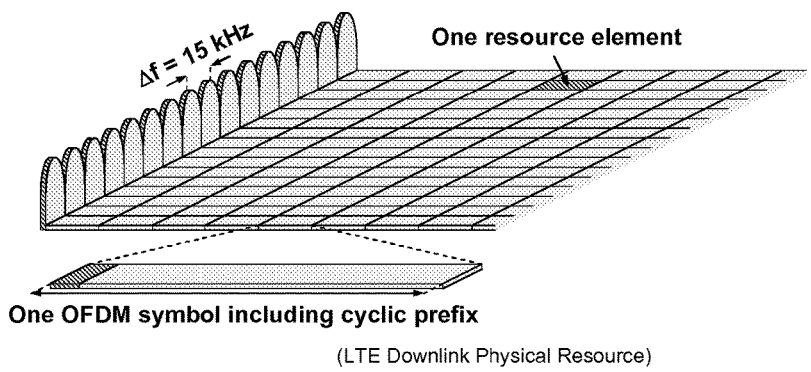
FIG. 1 illustrates a time-frequency grid of LTE downlink physical resources, including one OFDM symbol including cyclic prefix.
Figure 2:
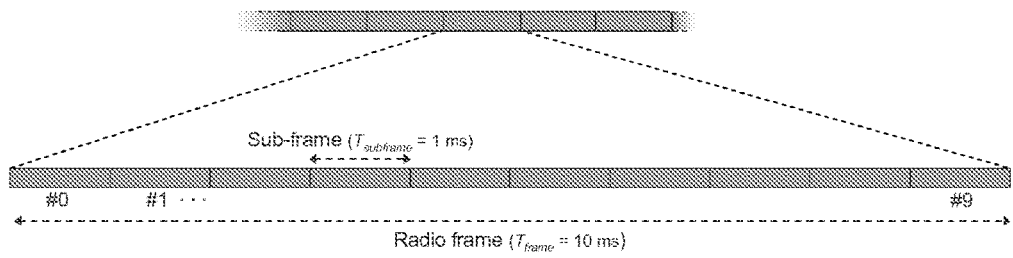
FIG. 2 illustrates a LTE downlink transmission organized into radio frames.
Figure 3:
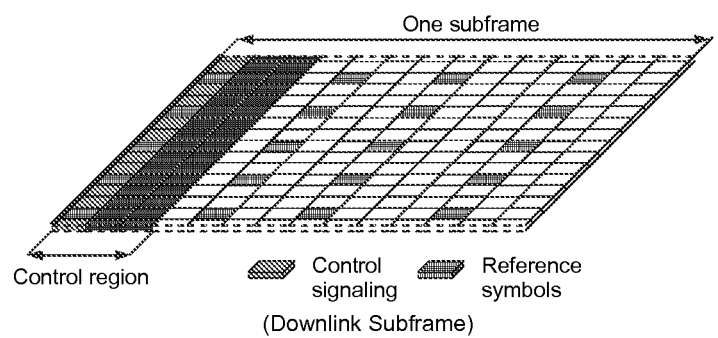
FIG. 3 illustrates a downlink subframe.
Figure 4:
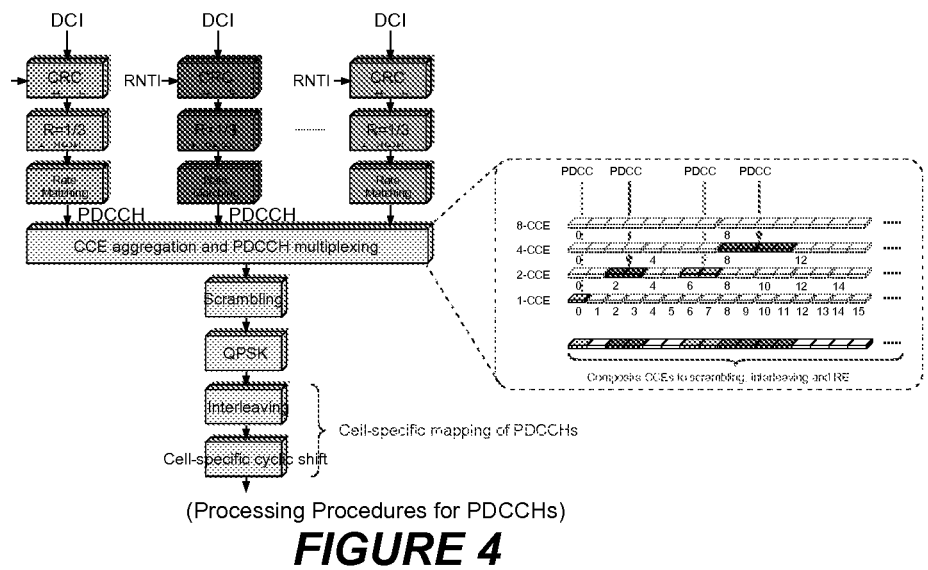
FIG. 4 illustrates processing procedures for PDCCHs.
Figure 5:
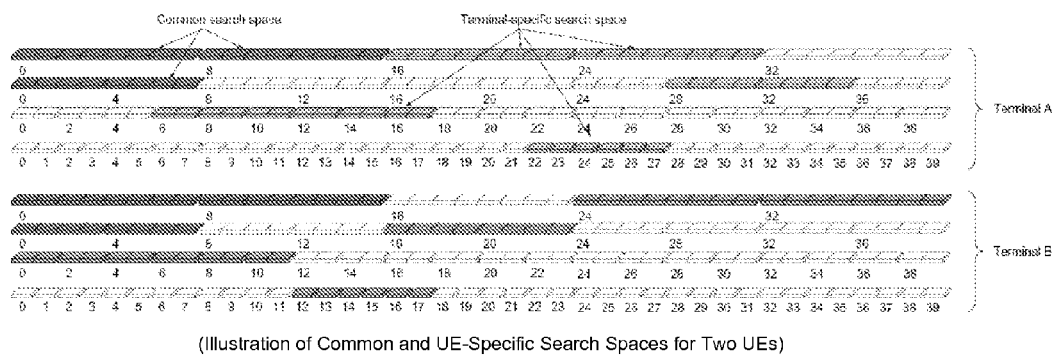
FIG. 5 illustrates common and UE specific search spaces for two UEs.
Figure 6:
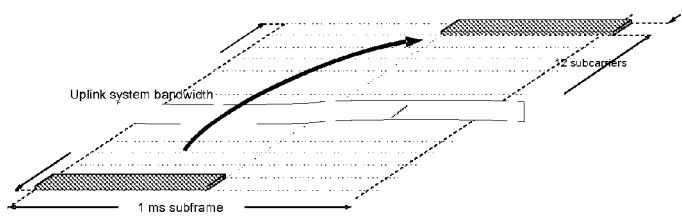
FIG. 6 illustrates uplink L1/L2 control signaling transmissions on a Rel-8 based PUCCH.
Figure 7:
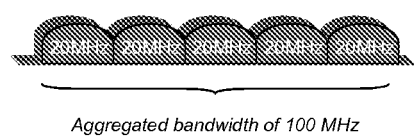
FIG. 7 illustrates carrier aggregation.
Figure 8:
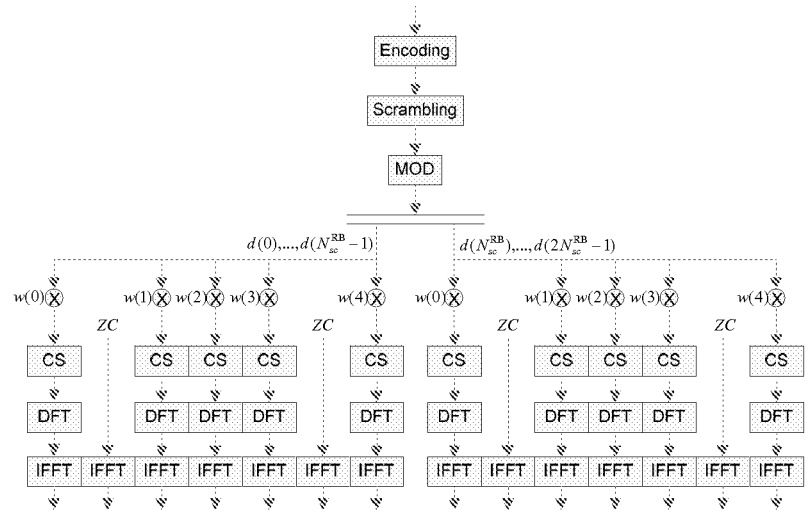
FIG. 8 illustrates a block diagram for DFTS-OFDM based PUCCH Format 3 for a UE supporting more than 4 HARQ bits in normal CP subframes.
Figure 9:
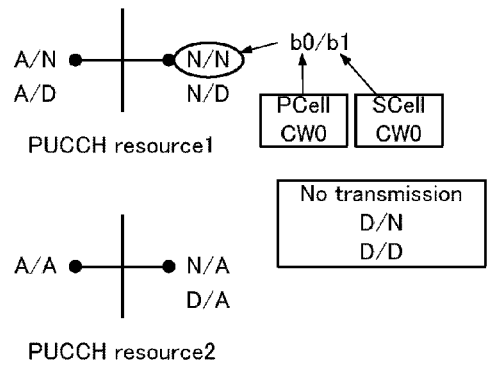
FIG. 9 illustrates mapping of format 1b with channel selection for 2 A/N bits.
Figure 10:
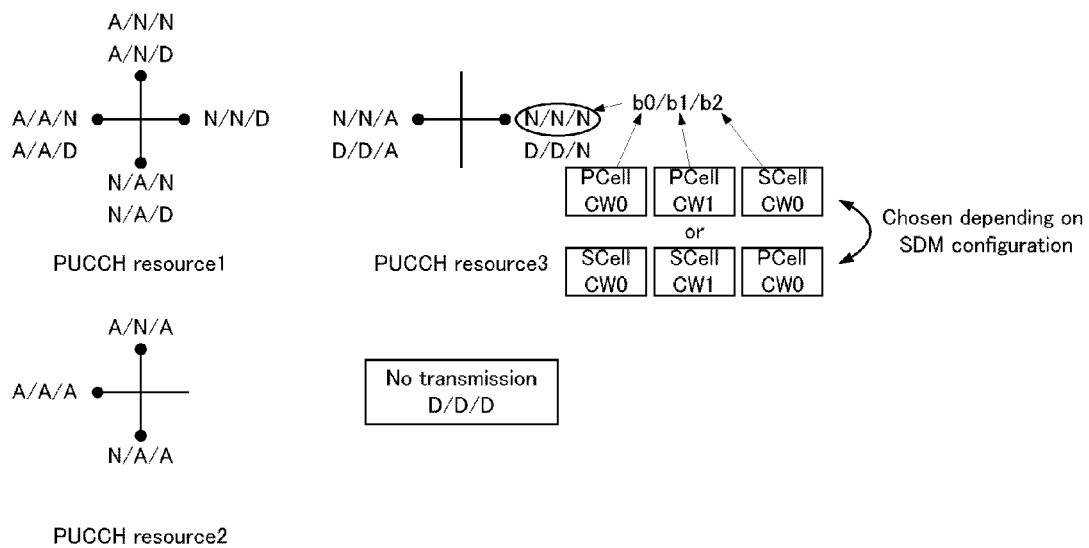
FIG. 10 illustrates mapping of format 1b with channel selection for 3 A/N bits.
Figure 11:
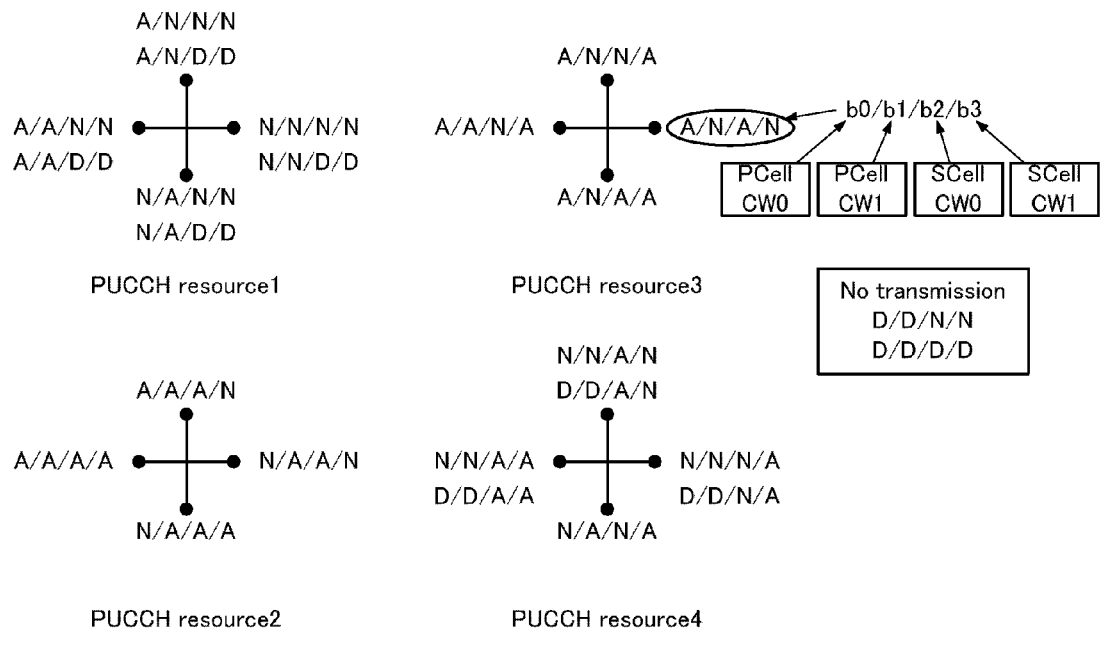
FIG. 11 illustrates mapping of format 1b with channel selection for 4 A/N bits.
Figure 12:
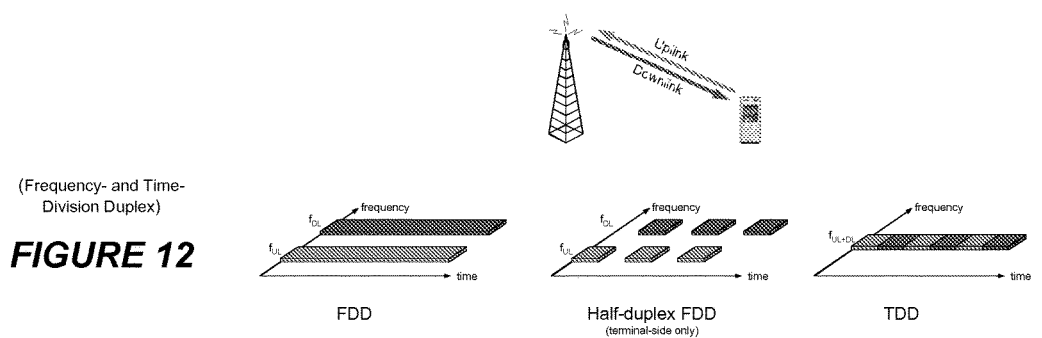
FIG. 12 illustrates Frequency Division Duplex (FDD) and Time Division Duplex (TDD) communications for a node.
Figure 13:
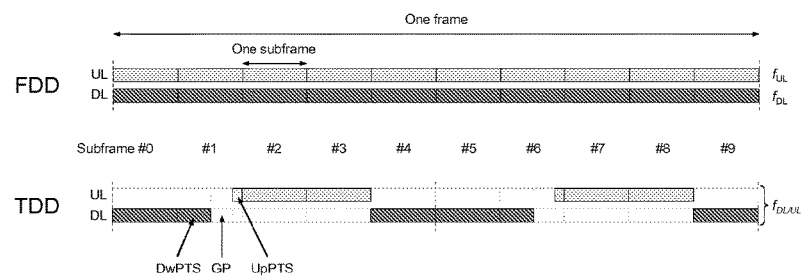
FIG. 13 illustrates uplink/downlink time/frequency structure for LTE in case of FDD and TDD.
Figure 14:
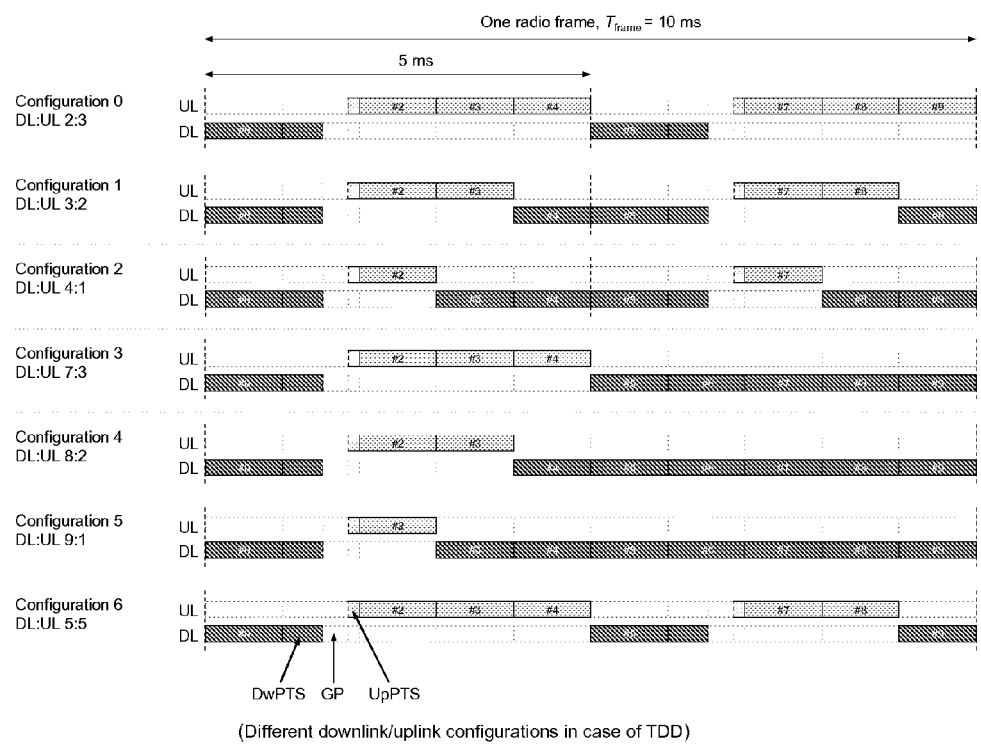
FIG. 14 illustrates seven different configurations for downlink/uplink TDD communications.
Figure 15:
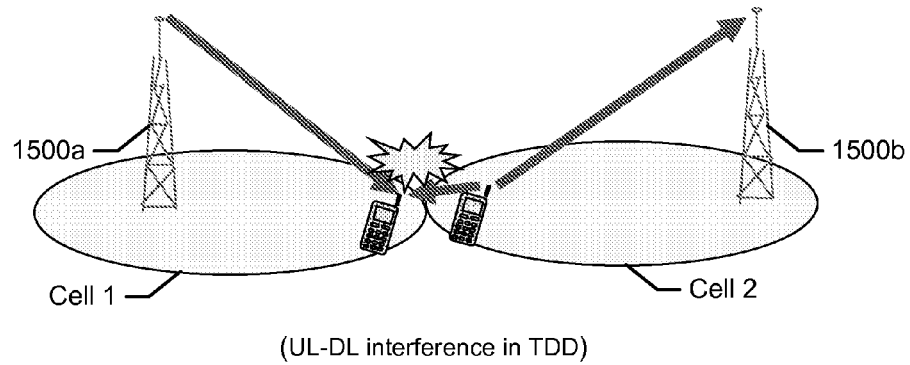
FIG. 15 illustrates UL and DL interference in TDD communications between a cell provided by one network node and another cell provided by another network node.
Figure 16:
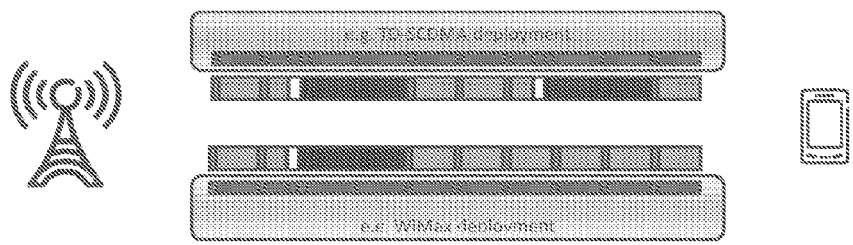
FIG. 16 illustrates carrier aggregation of TDD cells with different U/D configurations.
Figure 17:
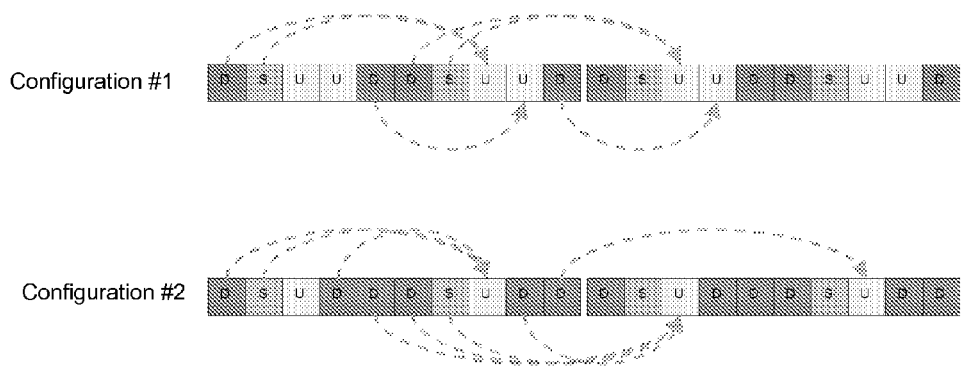
FIG. 17 illustrates PDSCH A/N feedback timing for two different types of configured cells.
Figure 18A:
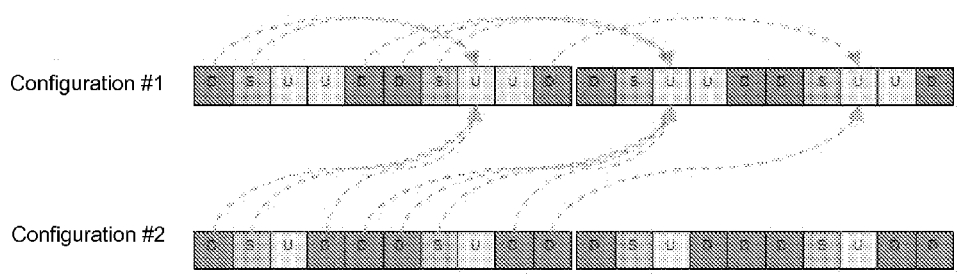
FIG. 18a illustrates PDSCH A/N feedback timings for aggregation of a configuration 1 type cell.
Figure 18B:
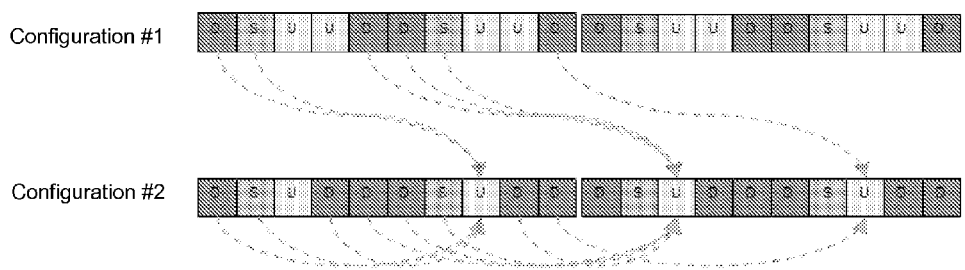
FIG. 18b illustrates PDSCH A/N feedback timings for aggregation of a configuration 2 type cell.
Figure 19:
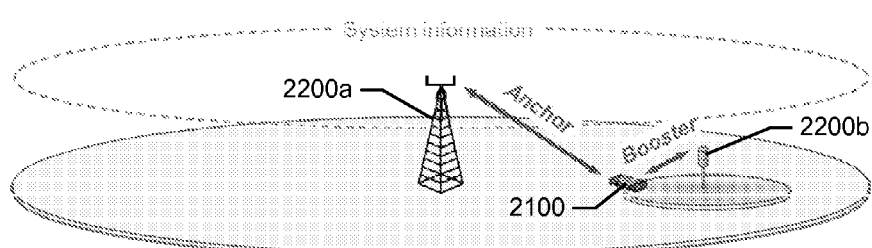
FIG. 19 illustrates a UE having dual connectivity to anchor and booster cells.
Figure 20:
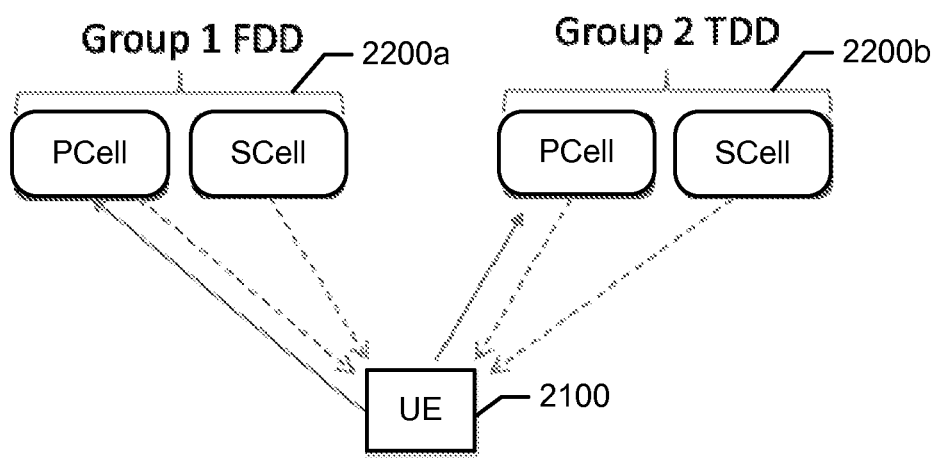
FIG. 20 illustrates a UE that is connected to two network nodes, one providing FDD carriers and the other providing TDD carriers, and which operate to provide primary aggregation groups and secondary aggregation groups according to some embodiments.

Aggregation Groups and Group PCells:

FIG. 20 illustrates a UE that is connected to two network nodes 2200a and 2200b which operate to provide primary aggregation groups and secondary aggregation groups according to some embodiments. The network nodes 2200a and 2200b provide cells serving uplink (UL) and downlink (DL) resources for wireless communications between the network node (2200) and a UE 2100. In the example embodiment of FIG. 20, network node 2200a provides FDD carriers within its cells for communication with the UE 2100. In contrast, the other network node 2200b provides TDD carriers within its cells for communication with the UE 2100. In some embodiments, the network node 2200a is configured to form one aggregation group of FDD carrier cells ("Group 1 FDD") allocated for communication with the UE 2100. The other network node 2200b is configured to form another aggregation group of TDD carrier cells ("Group 2 TDD") allocated for communication with the UE 2100. The aggregation groups each have a primary serving cells ("PCell") and one or more secondary serving cells ("SCell(s)"). Accordingly, the UE 2100 can simultaneously utilize additional cell capacity provided by the two network nodes 2200a and 2200b, while using a FDD based protocol when communicating with the network node 2200a and another TDD based protocol when communicating with the network node 2200b.

Figure 23:
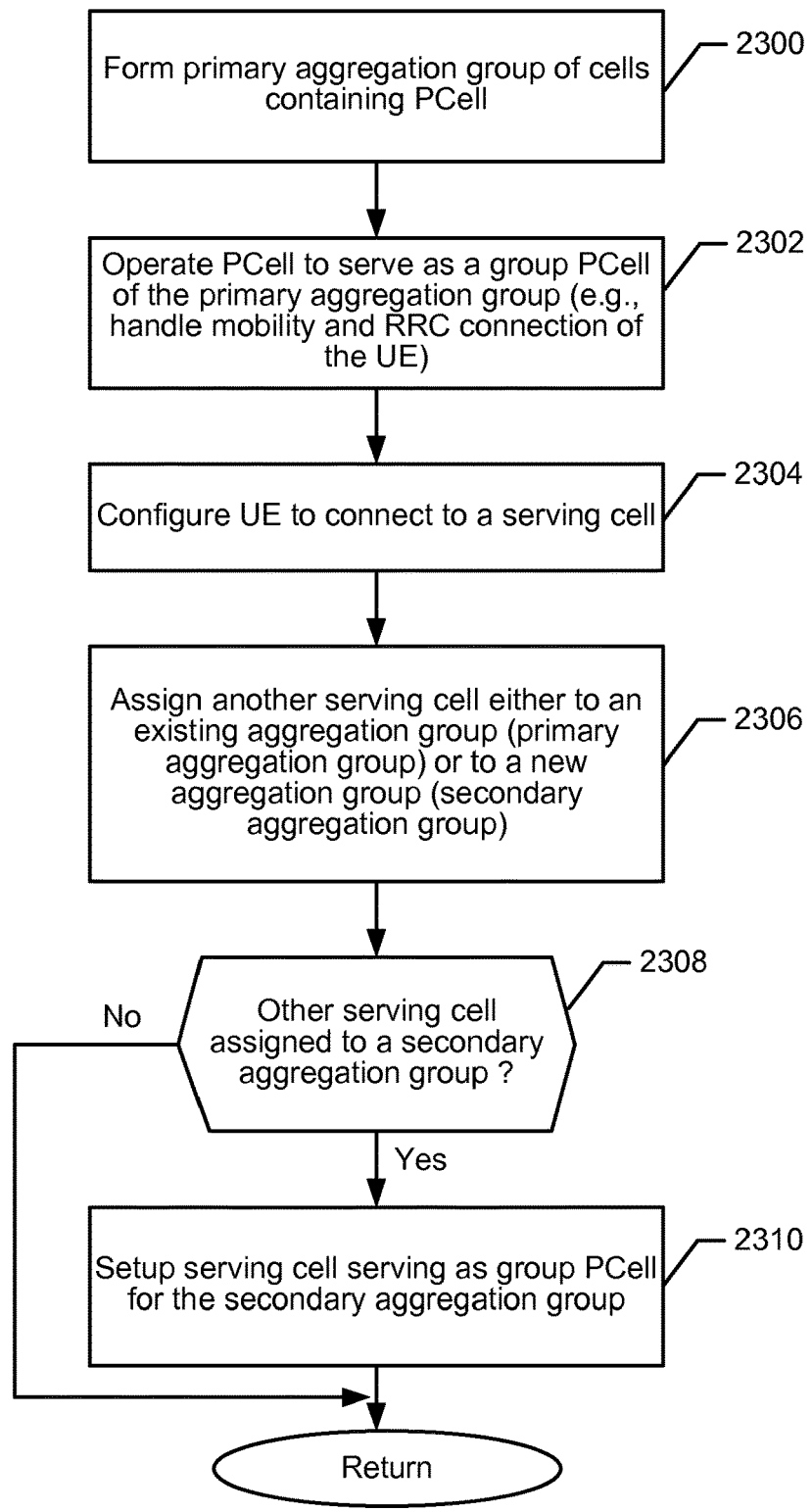
FIG. 23 is a flowchart of operations and methods by a network node for providing cells serving UL and DL resources for wireless communications between the network node and a UE according to some embodiments.
Figure 24:
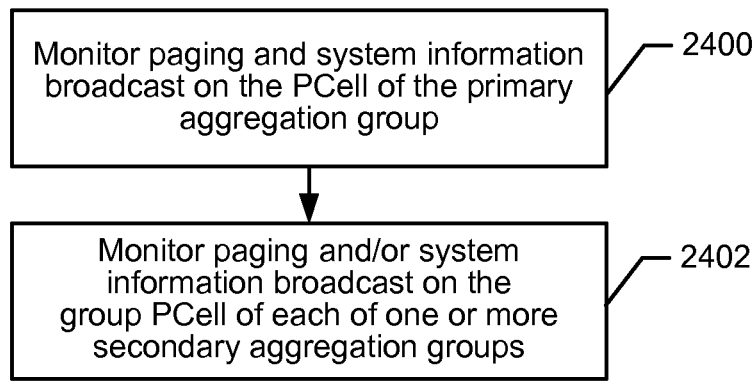
FIGS. 24-25 are flowcharts of operations and methods by a UE and network node for monitoring and communicating through primary cells of associated primary and secondary aggregation groups of cells.
Figure 25:
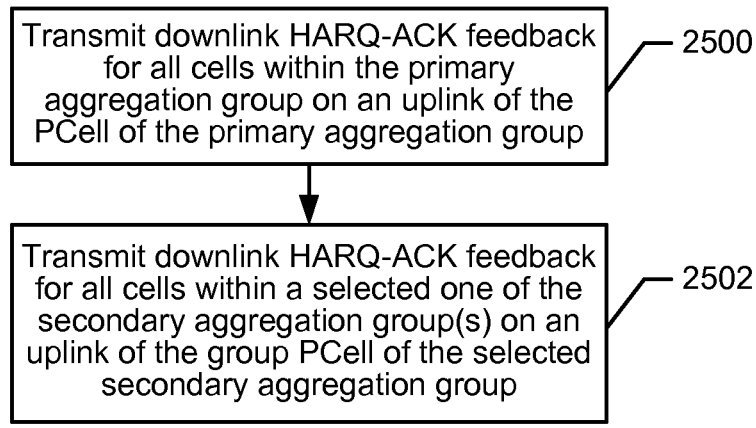

The formation and use of aggregation groups is described below and some embodiments are illustrated in FIG. 23-25. Reference is now made to FIG. 23 showing a flowchart of operations which may be carried out by one or more network nodes, such as the network nodes 2200a and 2200b, providing cells for communication with UEs, such as UE 2100. In Release 11 ("Rel-11") LTE, a UE first connects to a network node with a serving cell, which becomes the primary cell (PCell) for the UE. According to a first aspect of some embodiments, an aggregation group is also formed (block 2300 of FIG. 23) and this so-called primary aggregation group (or aggregation group 0) contains this PCell. The PCell is also operated (block 2302 of FIG. 23) by the network node as the group PCell of the primary aggregation group. The PCell continues to handle the mobility and RRC connection of the UE.

Thus, the PCell can be determined to be a first one of the cells assigned to the primary aggregation group with UL and DL resources for communication with the UE. Similarly, a serving cell can be setup as the group PCell in the secondary aggregation group in response to the serving cell being a first cell assigned to the secondary aggregation group with UL and DL resources for communication with the UE.

Subsequently, the network node can configure (block 2304 of FIG. 23) the UE to connect to one or more additional serving cell(s) via operations including: (1) carrier aggregation within/from the same network node; or (2) dual connectivity from a different network node. As will be explained in further detail below with regard to FIGS. 29 and 32, with the configuration of the additional serving cell(s), the additional serving cell(s) is also assigned (block 2306 of FIG. 23) either to the existing aggregation group (the primary aggregation group) or to another aggregation group, which may be an existing other aggregation group or a new other aggregation group. If the aggregation group assignment is skipped in the configuration message, the new cell is understood by the UE to assigned to the primary aggregation group. An aggregation group other than the primary aggregation group is referred to as a secondary aggregation group.

In some further embodiments, the network node can deconfigure a serving cell for a UE when the resource for the serving cell is no longer needed. If an aggregation group contains no serving cells after deconfiguration, the aggregation group is also removed. In one embodiment, within an aggregation group, the group PCell cannot be deconfigured before other serving cells in the same aggregation group. It is possible to deconfigure all serving cells from an aggregation group at once. In an alternative embodiment, a high-layer control signal can be used to deconfigure the group PCell and configure another serving cell in the same aggregation group to be the group PCell.

When one or more secondary aggregation group(s) are determined (block 2308 of FIG. 23) to be created for assignment of additional serving cell(s), each secondary aggregation group is setup (block 2310 of FIG. 23) with a cell that serve as the group PCell for the secondary aggregation group. This group PCell is designated to the cell when a new secondary aggregation group is created for this cell. For a secondary aggregation group with more than one serving cells, it is also possible to reconfigured the group PCell to another cell within the same aggregation group via higher-layer signaling.

Referring now to FIG. 24 showing a flowchart of operations which may be carried out by a UE configured to communicate with one or more networks nodes providing a primary aggregation group and at least one secondary aggregation group. A network node can carry out corresponding operations according to FIG. 24. A network node broadcasts (block 2400) to the UE paging and system information relating to any of the cells in the primary aggregation group of cells on the PCell of the primary aggregation group. The UE monitors (block 2400) paging and system information broadcast on the PCell of the primary aggregation group. The network node may optionally be configured to also broadcast (block 2402) to the UE paging and/or system information relating to any of the cells in the secondary aggregation group of cells on the group PCell of the secondary aggregation group.

The UE may optionally and correspondingly be configured to monitor (block 2402 of FIG. 24) the paging and/or system information broadcast on the group PCell of each of the one or more secondary aggregation groups (additional secondary aggregation group(s) of PCells), which operations may be selectively activated for defined deployment and application scenarios. The UE may monitor (block 2400) paging and system information, which is broadcast by the at least one network node relating to any cells in the primary aggregation group, on the PCell of the primary aggregation group, and monitor (block 2402) paging and/or system information, which is broadcast by the at least one network node relating to any cells in a selected one of the one or more secondary aggregation groups, on a group PCell of the selected one of the one or more secondary aggregation groups.

Scheduling and HARQ-ACK Operations within Each Aggregation Group:

According to a second aspect of some embodiments, scheduling and HARQ-ACK feedback timings and procedures can be treated independently within each aggregation group. Each serving cell can normally send the scheduling information on its own. It is possible to configure cross-carrier scheduling within each aggregation group such that a serving cell other than the group PCell can be scheduled by another cell in the same group. The group PCell can only be scheduled by its own PDCCH/EPDCCH.

The UE transmits downlink (DL) HARQ-ACK feedback for all serving cells within a same aggregation group on the group PCell uplink (UL). Referring to the example operations of FIG. 25 which can be carried out by a UE, the UE transmits (block 2500) downlink HARQ-ACK feedback for all serving cells within the primary aggregation group on an uplink of the PCell of the primary aggregation group. The UE also transmits (block 2502) downlink HARQ-ACK feedback for all serving cells within a selected one of the secondary aggregation group(s) on an uplink of the group PCell of the selected secondary aggregation group.

Figure 28:
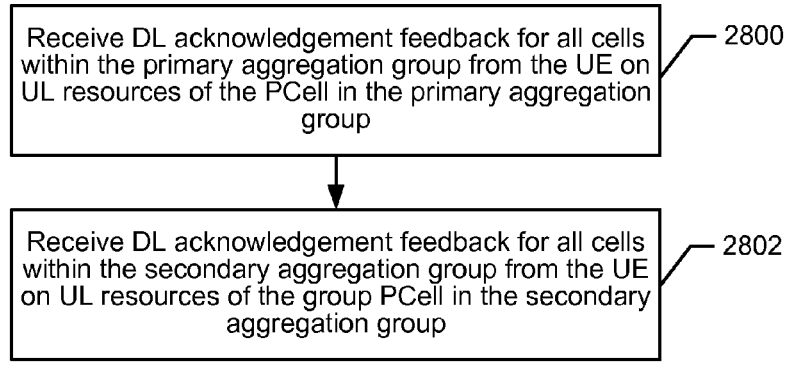
FIGS. 28-31 are flowcharts of further operations and methods by a network node for controlling a UE through communications on primary cells of primary and secondary aggregation groups of cells according to some embodiments.

Referring to FIG. 28, in a corresponding manner to the UE, the network node receives (block 2800) on UL resources of the PCell of the primary aggregation group, acknowledgement feedback from the UE acknowledging receipt of communications from the network node that used DL resources of any of the cells within the primary aggregation group. The network node also receives (block 2802) on UL resources of the group PCell of the secondary aggregation group, acknowledgement feedback from the UE acknowledging receipt of communications from the network node that used DL resources of any of the cells within the secondary aggregation group.

More particularly, in the context of FIG. 25, the network node receives (block 2500) from the UE HARQ-ACK feedback for all cells within the primary aggregation group on UL resources of the PCell of the primary aggregation group, and receives (block 2502) from the UE HARQ-ACK feedback for all cells within the secondary aggregation group on UL resources of the group PCell of the secondary aggregation group.

Therefore, for a UE configured with multiple aggregation groups, multiple PUCCH signals (one for each of the aggregation groups) can be transmitted by the UE on multiple ULs. By further example, the UE can transmit DL HARQ-ACK feedback for all serving cells within the primary aggregation group on the PCell uplink of the primary aggregation group, transmit DL HARQ-ACK feedback for all serving cells within a first one of the secondary aggregation groups on the group PCell uplink of the first one of the secondary aggregation groups, and so on to transmit DL HARQ-ACK feedback for all serving cells within a n'th one of the secondary aggregation groups on the group PCell uplink of the n'th one of the secondary aggregation groups.

As a first example of carrier aggregation, a UE is aggregating two FDD cells and two TDD cells. Two aggregation groups are configured for the FDD cells and the TDD cells separately. Within each group, all serving cells are of the same duplex type. For example, the PCell and the SCell of Group 1 FDD all use FDD UL and DL resources for communications between the UE 2100 and a network node. In contrast, the PCell and the SCell of the Group 2 TDD all use TDD UL and DL resources for communications between the UE 2100 and the network node. The UE and network can follow existing scheduling and HARQ-ACK feedback timings and procedures of the duplex type for the operations that can be independently performed within each group. This design simplifies the UE and network node implementation complexity by avoiding interactions between the two duplex types (i.e., FDD cells and the TDD cells).

For example, in the context of FIG. 20, a single network node 2200 can provide FDD cells for use by the UE 2100 that are aggregated in Group 1 FDD and at the same time can provide TDD cells for use by the UE 2100 that are aggregated in Group 2 TDD, which are operated in accordance with one or more embodiments disclosed herein.

As a second example of dual connectivity, a UE is connected to two or more network nodes that are communicatively connected by a network connection(s) that is not a low-latency connection. A low-latency connection is one that provides sufficiently low latency communications between the two or more network nodes so that signaling received by one of the network nodes from a UE can be provided to the other network nodes to allow proper operational control (e.g, scheduling and HARQ-ACK processes) responsive thereto, and vice versa. A network node can configure a separate aggregation group for the cells from each of the other network nodes. This configuration then allows cells from each network node to operate scheduling and HARQ-ACK processes efficiently without the hindrance of slow backhaul connections to other nodes.

For example, the UE can transmit DL acknowledgements (e.g., HARQ-ACK feedback) to a first one of the network nodes through UL resources of the PCell of the aggregation group of the first network node, and can transmit DL acknowledgements (e.g., HARQ-ACK feedback) to a second one of the network nodes through UL resources of the group PCell of the secondary aggregation group of the second network node. Thus, the first and second network nodes do not need to be connected by a low-latency connection for purposes of HARQ-ACK processes because the HARQ-ACK feedback is provided by the UE directly to whichever of the network nodes generated the downlink communication(s).

In the context of FIG. 20, a network node 2200a can provide FDD cells for use by the UE 2100 that are aggregated in Group 1 FDD. A separate network node 2200b can provide TDD cells for use by the UE 2100 that are aggregated in Group 2 TDD, which are operated in accordance with one or more embodiments disclosed herein. The network nodes 2200a and 2200b can therefore be connected by a network connection(s) that is not a low-latency connection.

In a third example, a UE is connected to a first network node with one FDD cell and a second network node with one FDD and two TDD cells. The network can configure three aggregation groups for the UE: one for the FDD cell from the first network node, one for the FDD cell from the second network node, and one for the TDD cells from the second network node. The aggregation group configuration allows the operations to run in parallel and relatively independently of each other.

Random Access and Timing Advance Control:

One important use case of aggregation group configuration is to handle network nodes that are not connected with low-latency backhaul/connections. It should also be possible to operate timing advance measurement and random access handling within each aggregation group. According to these aspects, a network node can operate each aggregation group PCell to order the UE to transmit Physical Random Access Channel (PRACH) preamble on the UL of a serving cell in this aggregation group. The network node can measure the UL timing and reply with timing advance commands to the UE on the aggregation group PCell.

Each aggregation group may further contain cells belonging to more than one timing advance group.

Figure 26:
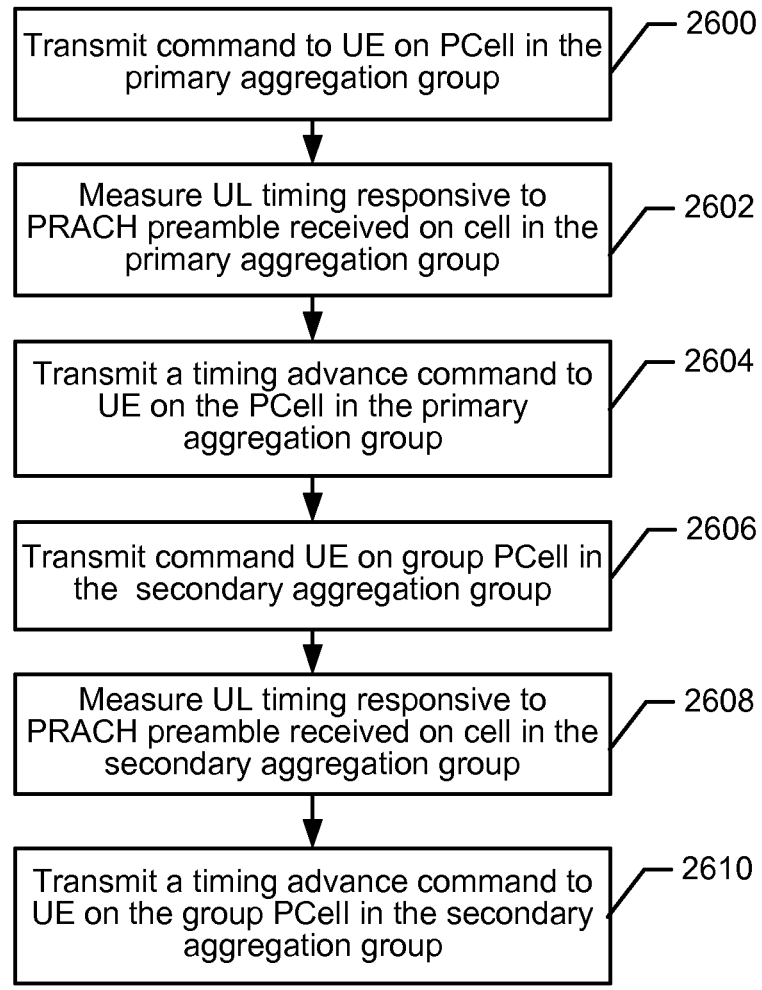
FIGS. 26-27 are a flowcharts of operations and methods by a network node and UE, respectively, for controlling timing of the UE through communications on primary cells of primary and secondary aggregation groups of cells according to some embodiments.
Figure 27:
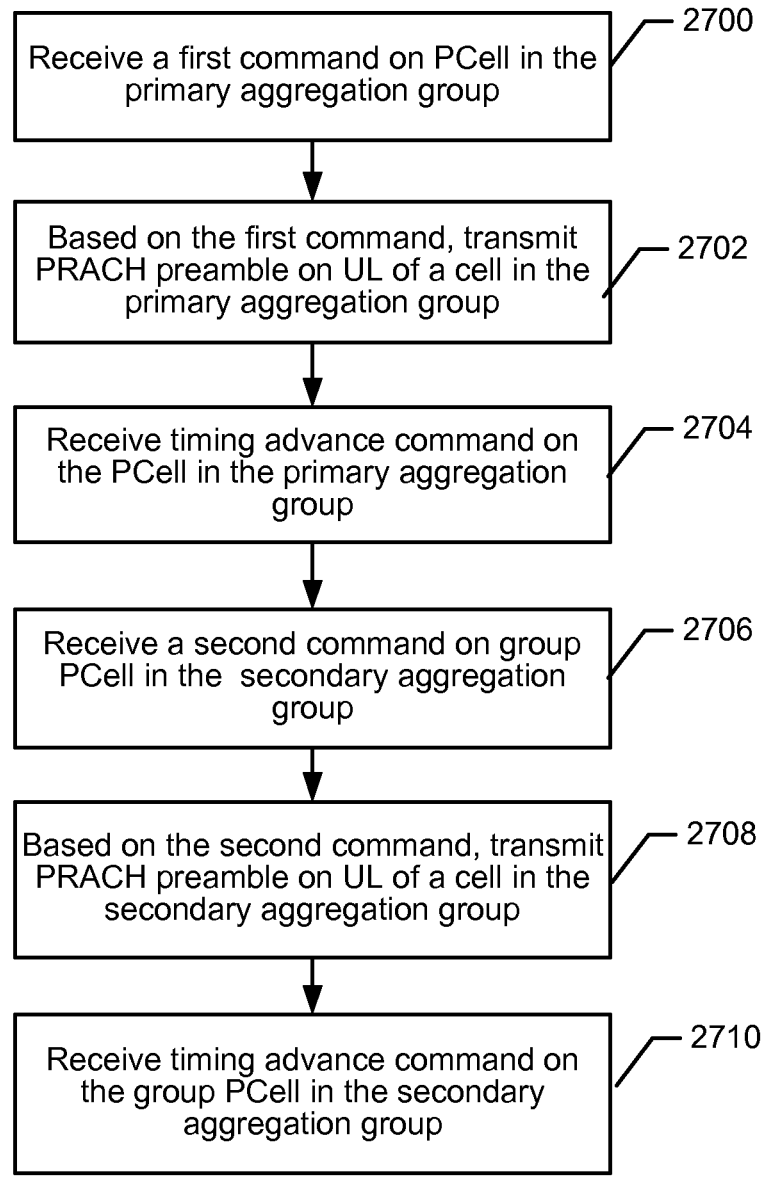

Further example operations are illustrated in FIG. 26 showing a flowchart of operations which may be carried out by one or more network nodes and FIG. 27 showing a flowchart of operations which may be carried out by a UE.

Referring to FIGS. 26 and 27, a network node transmits (block 2600) a first command to the UE on the PCell in the primary aggregation group to control the UE to transmit a Physical Random Access Channel (PRACH) preamble on an UL resource of a cell (e.g., serving cell) in the primary aggregation group. The UE receives (block 2700) the first command on the PCell in the primary aggregation group. Based on the first command, the UE is controlled to transmit (block 2702) the PRACH preamble on an UL resource of a cell (e.g., serving cell) in the primary aggregation group.

The network node measures (block 2602) uplink timing responsive to the PRACH preamble received from the UE. The network node transmits (block 2604) a timing advance command to the UE on a DL resource of the PCell of the primary aggregation group. The UE receives (block 2704) the timing advance command on a DL resource of the PCell in the primary aggregation group, and adjusts timing of its transmissions using UL resources of at least one cell in the primary aggregation group based on the timing advance command.

The same or another network node transmits (block 2606) a second command to the UE on the group PCell in the secondary aggregation group to control the UE to transmit a PRACH preamble on an UL resource of a cell in the secondary aggregation group. The UE receives (block 2706) the second command on the group PCell in the secondary aggregation group and, based thereon, transmits (block 2708) a PRACH preamble on an UL resource of a cell in the secondary aggregation group.

The network node measures (block 2608) UL timing using the PRACH preamble received from the UE on the UL resource of the cell (e.g., serving cell) in the secondary aggregation group. The network node transmits (block 2610) a timing advance command on a DL resource of the group PCell in the secondary aggregation group. The UE receives (block 2710) the timing advance command on the DL resource of the group PCell in the secondary aggregation group, and adjusts its timing of transmissions using UL resources of at least one cell of the secondary aggregation group based on the timing advance command.

The same or other network node can similarly obtain PRACH preambles from the UE or another UE on UL resources of serving cells of other secondary aggregation groups and can provide responsive timing advance commands the UE(s) on group PCells of the other secondary aggregation groups. In a corresponding manner, a UE can transmit PRACH preambles on the UL of serving cells of other secondary aggregation groups and can receive responsive timing advance commands on PCells of the corresponding other secondary aggregation groups.

One example communication system that can benefit from such operations includes a plurality of remote radio heads that provide carrier aggregation for a UE through the remote radio heads. Circuitry associated with the remote radio heads can determine different timing advance values that are used to control timing of communications between the UE and the respective remote radio heads.

UE Identity and high layer aspects concerning group configuration:

The UE may further be configured with a common or specific Radio Network Temporary Identity (C-RNTI) per group that it is configured with. Further the UE may perform radio link monitoring separately per group, and if the radio link monitoring indicates occurrence of a radio link failure the UE may declare separate radio link failure per group. For example, if a UE is using carriers from two different network nodes (different aggregation groups), then the UE can perform the radio link monitoring for both aggregation groups. An alternative is that one of the PCells acts as an master PCell wherein the UE only declares radio link failure if the link fails towards that PCell.

Further the UE may also monitor the system information for all of its PCells separately per group or alternatively the UE monitors system information only on the master PCell. For the cells that the UE does not monitor system information on the UE is sent the system information from an eNB or other network node by dedicated RRC signaling.

Figure 29:
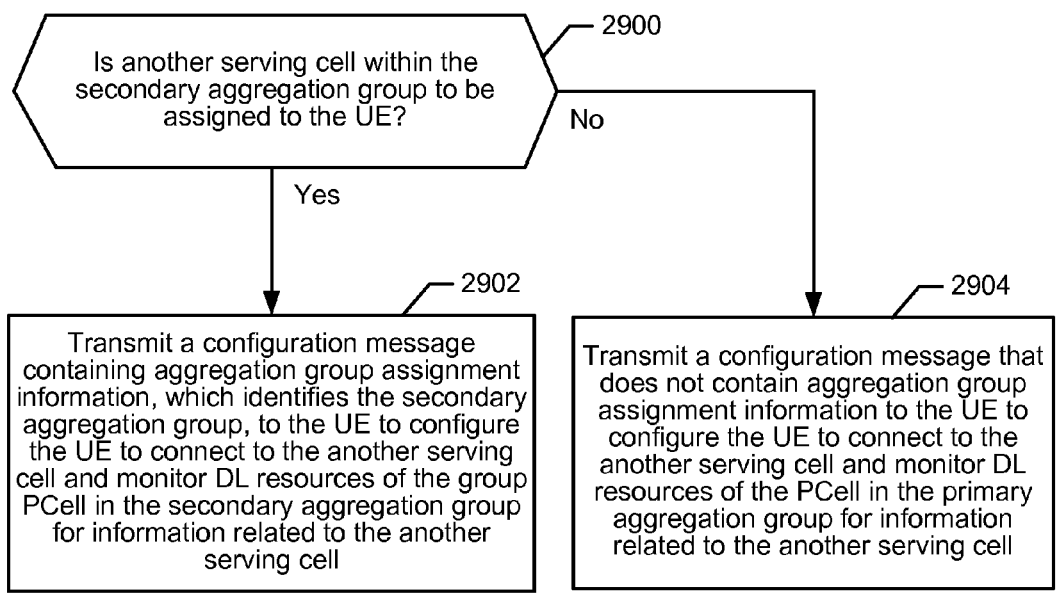
Figure 30:
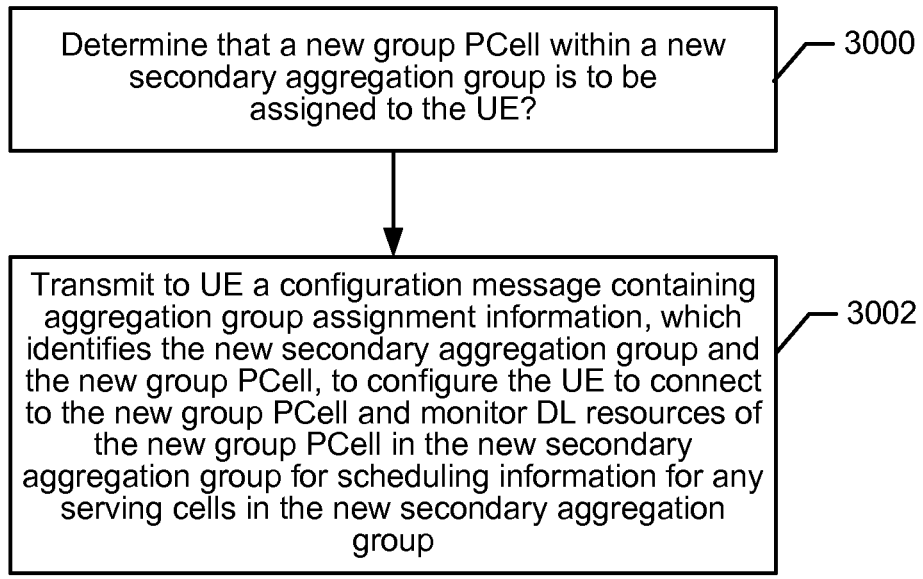
Figure 31:
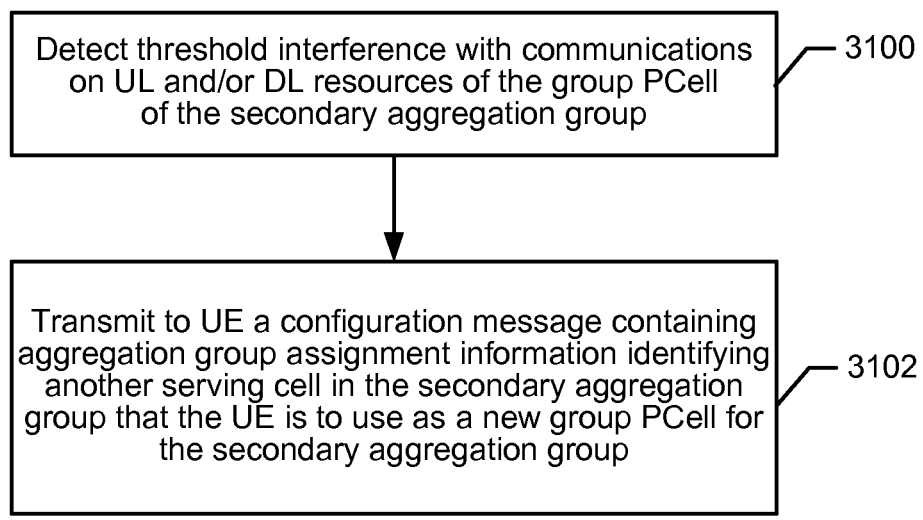
Figure 32:
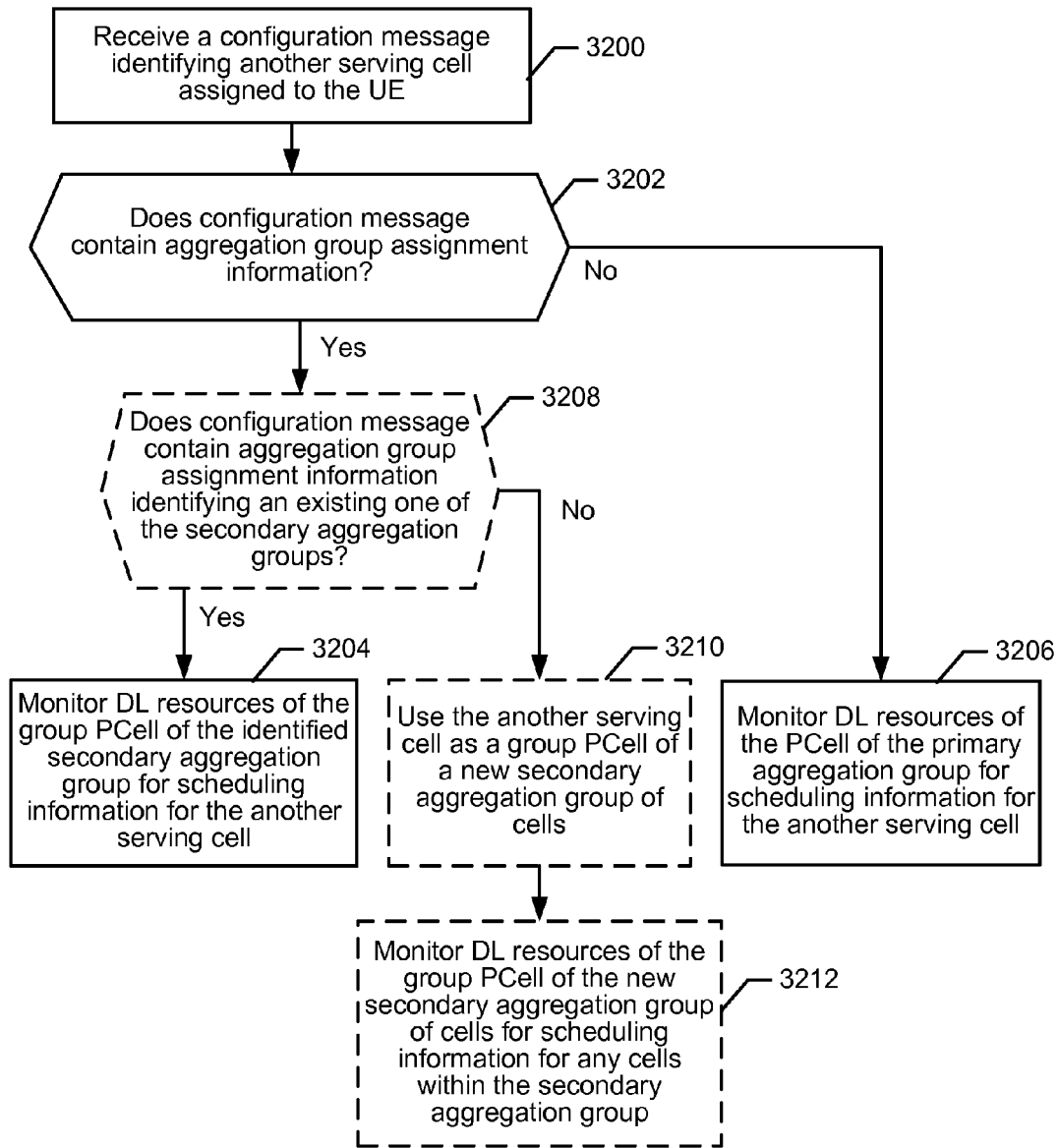
FIGS. 32-34 are flowcharts of further operations and methods by a UE for operating using primary cells of primary and secondary aggregation groups of cells according to some embodiments.
Figure 33:
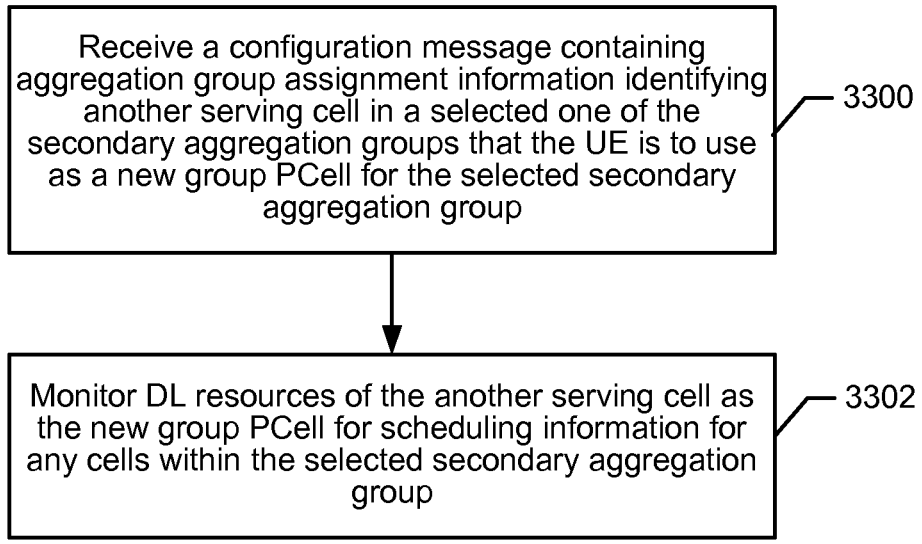
Figure 34:
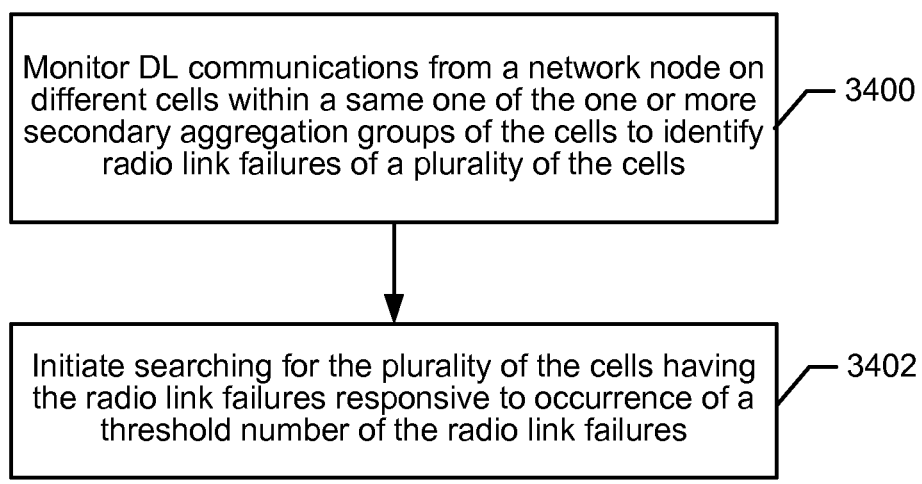

Assignment of Serving Cells to Primary or Secondary Aggregation Groups:

Example operations by a network node that may be used to assign a serving cell to a primary or secondary aggregation group are shown in FIGS. 29-31. Corresponding operations by a UE that may be used to receive a new serving cell assignment as either a primary or secondary aggregation group and use of the new serving cell are shown in FIG. 32-34.

Referring to FIG. 29, when a network node decides to assign another serving cell to a UE for use in communication with the network node, the network node determines (block 2900) whether the another serving cell is to be within the primary aggregation group or within a secondary aggregation group. The secondary aggregation group may already exist or may be a new secondary aggregation group of cells for use by the UE.

Based on determining that the another serving cell is to be within the secondary aggregation group, the network node transmits (block 2902) a configuration message containing aggregation group assignment information, which identifies the secondary aggregation group, to the UE to configure the UE to connect to the another serving cell and monitor DL resources of the group PCell in the secondary aggregation group for information related to the another serving cell.

In contrast, based on determining that the another serving cell is to be within the primary aggregation group, the network node transmits (block 2904) a configuration message that does not contain aggregation group assignment information to the UE to configure the UE to connect to the another serving cell and monitor DL resources of the PCell in the primary aggregation group for information related to the another serving cell.

When the configuration message identifies a particular secondary aggregation group of cells that does not correspond to an existing secondary aggregation group of cells, the serving cell becomes the group PCell for the particular secondary aggregation group of cells in accordance with some embodiments. The network node can assign further serving cells to the particular secondary aggregation group by transmitting configuration messages to the UE that identify the particular secondary aggregation group. The network node can then transmit paging and/or system information relating to the further serving cells through DL resources of the group PCell for the new secondary aggregation group, in accordance with some embodiments.

In one further embodiment, based on determining that the another serving cell is to be within the secondary aggregation group, the network node transmits (block 2902) the configuration message on DL resources (e.g., radio resource control signaling) of the group PCell in the secondary aggregation group. Based on determining that the another serving cell is to be within the primary aggregation group, the network node transmits (block 2904) the configuration message on DL resources of the PCell in the primary aggregation group.

The network node may change which of the cells within one of the secondary aggregation groups is the group PCell. For example, as shown in FIG. 30, the network node determines (block 3000) that a new group PCell within a new secondary aggregation group is to be assigned to the UE. Based on the determination (block 3000) the network node transmits (block 3002) a configuration message containing aggregation group assignment information, which identifies the new secondary aggregation group and the new group PCell, to the UE to configure the UE to connect to the new group PCell and monitor DL resources of the new group PCell in the new secondary aggregation group for scheduling information for any serving cells in the new secondary aggregation group.

Network node may change which cell is the group PCell for a particular secondary aggregation group based on, for example, the existing group PCell becoming bad due to excessive interference. In the example embodiment of FIG. 31, the network node detects (block 3100) threshold interference with communications on UL and/or DL resources of the group PCell of the secondary aggregation group, and based thereon transmits (block 3102) to the UE a configuration message containing aggregation group assignment information identifying another serving cell in the secondary aggregation group that the UE is to use as a new group PCell for the secondary aggregation group.

Reference is now made to FIGS. 32-34 which show corresponding operations and methods by a UE. Referring first to FIG. 32, the UE receives (block 3200) a configuration message identifying another serving cell assigned to the UE. The configuration message may be received (block 3200) on DL resources of either the PCell of the primary aggregation group or on DL resources of the group PCell of one of the one or more secondary aggregation groups. The UE determines (block 3202) whether the configuration message contains aggregation group assignment information. Based on the configuration message containing aggregation group assignment information that identifies one of the one or more secondary aggregation groups of the cells, the UE monitors (block 3204) DL resources of the group PCell of the one or more secondary aggregation groups for information related to the another serving cell. In contrast, based on the configuration message not containing aggregation group assignment information, the UE monitors (block 3206) DL resources of the PCell of the primary aggregation group for information related to the another serving cell.

The operations and methods of FIG. 32 may further include determining (block 3208) whether that the configuration message contains aggregation group assignment information that identifies a new secondary aggregation group of cells that is not an existing one of the one or more secondary aggregation groups of the cells and, if so, to use (block 3210) the another serving cell as a group PCell of the new secondary aggregation group of cells, and to monitor (block 3212) DL resources of the group PCell of the new secondary aggregation group of cells for information relating to any cells within the secondary aggregation group.

In a further embodiment of FIG. 33, the UE receives (block 3300) a configuration message containing aggregation group assignment information identifying another serving cell in a selected one of the one or more secondary aggregation groups that the UE is to use as a new group PCell for the selected one of the one or more secondary aggregation groups. Based on the configuration message, the UE monitors (block 3302) DL resources of the another serving cell as the new group PCell for scheduling information for any cells within the selected one of the one or more secondary aggregation groups.

In another further embodiment of FIG. 34, the UE monitors (block 3400) DL communications from a network node on different cells within a same one of the one or more secondary aggregation groups of the cells to identify radio link failures of a plurality of the cells. The UE initiates (block 3402) searching for the plurality of the cells having the radio link failures responsive to occurrence of a threshold number of the radio link failures.

Figure 21:
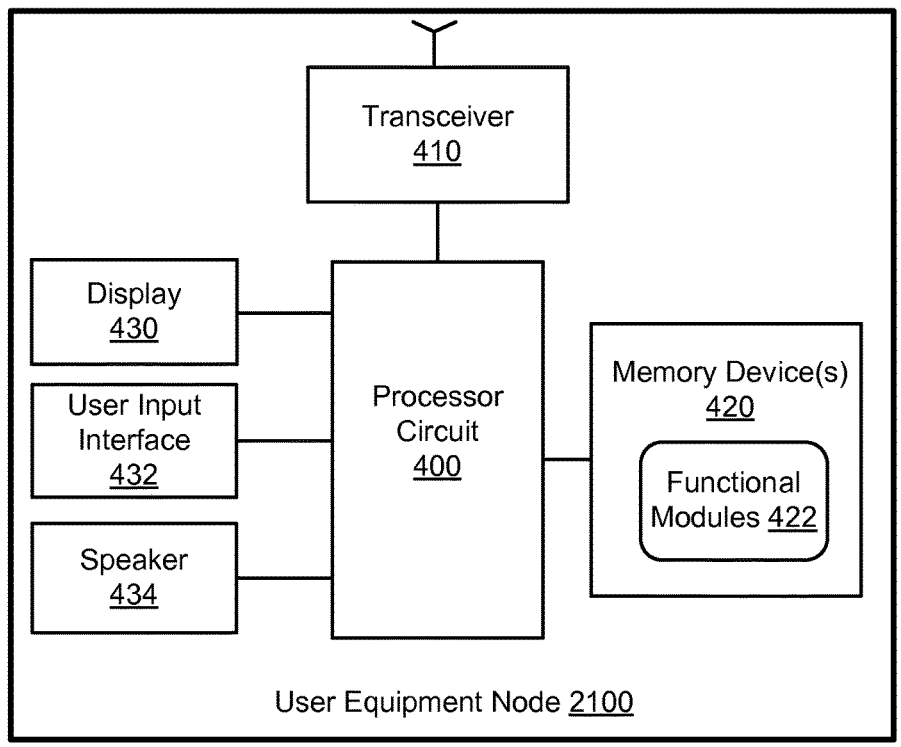
FIG. 21 is a block diagram of a UE that is configured according to some embodiments.

Example User Equipment Node and Network Node Configurations:

FIG. 21 is a block diagram of a user equipment (UE) 2100 that is configured according to some embodiments. The UE 2100 includes a transceiver 410, a processor circuit(s) 400, and a memory device(s) 420 containing functional modules 422. The UE 2100 may further include a display 430, a user input interface 432, and a speaker 434.

The transceiver 410 (e.g., LTE or other cellular transceiver, Bluetooth transceiver, WiFi transceiver, WiMax transceiver, or other communication transceiver) is configured to communicate with a network node through a wireless air interface. The processor circuit 400 may include one or more data processing circuits, such as a general purpose and/or special purpose processor (e.g., microprocessor and/or digital signal processor). The processor circuit 400 is configured to execute computer program instructions from the functional modules 422 of the memory device(s) 420, described below as a computer readable medium, to perform at least some of the operations and methods described herein as being performed by a UE.

Figure 22:
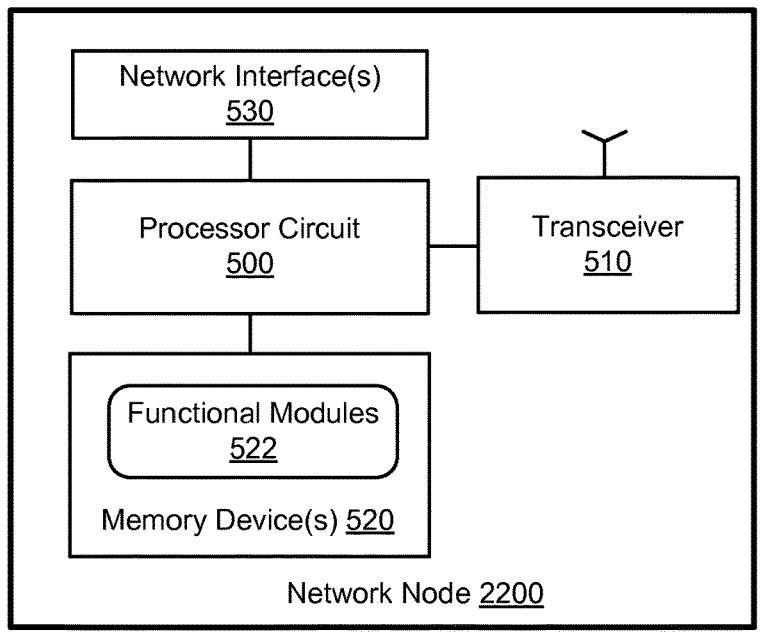
FIG. 22 is a block diagram of a network node that is configured according to some embodiments.

FIG. 22 is a block diagram of a network node 2200 that is configured according to some embodiments. The network node 2200 includes a transceiver 510, a network interface(s) 530, a processor circuit 500, and a memory device(s) 520 containing functional modules 522.

The transceiver 510 (e.g., LTE or other cellular transceiver, Bluetooth transceiver, WiFi transceiver, WiMax transceiver, or other communication transceiver) is configured to communicate with the UE 2100. The processor circuit 500 may include one or more data processing circuits, such as a general purpose and/or special purpose processor (e.g., microprocessor and/or digital signal processor) that may be collocated or distributed across one or more networks. The processor circuit 500 is configured to execute computer program instructions from the functional modules 522 of the memory device(s) 520, described below as a computer readable medium, to perform at least some of the operations and methods of described herein as being performed by a network node (e.g., PCell, SCell, network, etc.). The network interface 530 communicates with other network nodes and/or a core network.

FURTHER EXAMPLE EMBODIMENTS

Embodiment 1

A method by a network node for providing cells serving communications with a user equipment node (UE), the method comprising the steps of:

forming (block 2300 of FIG. 23) a primary aggregation group of the cells containing a primary cell, PCell;

operating (block 2302 of FIG. 23) the PCell to serve as a group PCell of the primary aggregation group;

configuring (block 2304 of FIG. 23) the UE to connect to an additional serving cell; and assigning (block 2306 of FIG. 23) the additional serving cell either to a secondary aggregation group of the cells.

Embodiment 2

The method by the network node of Embodiment 1, further comprising the step of:

setting up (block 2310 of FIG. 23) a PCell that serves as a group PCell the secondary aggregation group.

Embodiment 3

The method by the network node of Embodiment 2, further comprising the steps of:

controlling (block 2600 of FIG. 26) the UE to transmit a PRACH preamble on an uplink, UL, of a cell in the primary aggregation group;

measuring (block 2602 of FIG. 26) UL timing responsive to the PRACH preamble received from the UE on the cell in the primary aggregation group;

transmitting (block 2604 of FIG. 26) timing advance commands to the UE on the PCell in the primary aggregation group;

controlling (block 2606 of FIG. 26) the UE to transmit a PRACH preamble on an UL of a cell in the secondary aggregation group;

measuring (block 2608 of FIG. 26) UL timing responsive to the PRACH preamble received from the UE on the cell in the secondary aggregation group; and transmitting (block 2610 of FIG. 26) timing advance commands to the UE on the PCell of the secondary aggregation group.

Embodiment 4

A method by a user equipment node (UE) for communicating using cells provided by a network node, the method comprising the steps of:

monitoring (block 2400 of FIG. 24) paging and system information broadcast on a primary cell, PCell, of a primary aggregation group of the cells; and monitoring (block 2402 of FIG. 24) paging and/or system information broadcast on a PCell of each of one or more secondary aggregation groups of the cells.

Embodiment 5

The method by the UE of Embodiment 4, further comprising the step of:

transmitting (block 2500 of FIG. 25) downlink HARQ-ACK feedback for all cells within the primary aggregation group on an uplink of the PCell of the primary aggregation group; and transmitting (block 2502 of FIG. 25) downlink HARQ-ACK feedback for all cells within a selected one of the one or more secondary aggregation groups on an uplink of the PCell of the selected secondary aggregation group.

Embodiment 6

The method by the UE of Embodiment 4, further comprising the step of:

transmitting (block 2702 of FIG. 27) a PRACH preamble on uplink, UL, of a cell in the primary aggregation group;

receiving (block 2704 of FIG. 27) timing advance commands on the PCell of the primary aggregation group;

transmitting (block 2708 of FIG. 27) a PRACH preamble on UL of a cell in the secondary aggregation group; and receiving (block 2710 of FIG. 27) timing advance commands on the PCell of the secondary aggregation group.

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method by a network node for providing cells serving uplink (UL) and downlink (DL) resources for wireless communications between the network node and a user equipment node (UE), the method comprising the steps of:
   forming a primary aggregation group of cells that contains a primary cell (PCell);
   operating the UL and DL resources of the PCell in the primary aggregation group to communicate with the UE;
   configuring the UE to connect to a serving cell;
   assigning the serving cell to a secondary aggregation group of cells;
   setting up the UL and DL resources of the serving cell as a group PCell in the secondary aggregation group for communication with the UE;
   transmitting a timing advance command to the UE on a DL resource of the group PCell in the secondary aggregation group;
   transmitting a command to the UE on the PCell in the primary aggregation group to control the UE to transmit a Physical Random Access Channel (PRACH) preamble on a UL resource of a cell in the primary aggregation group;
   measuring UL timing responsive to the PRACH preamble received from the UE on the UL resource of the cell in the primary aggregation group;
   transmitting a timing advance command to the UE on a DL resource of the PCell in the primary aggregation group;
   transmitting a command to the UE on the group PCell in the secondary aggregation group to control the UE to transmit a PRACH preamble on a UL resource of a cell in the secondary aggregation group; and
   measuring UL timing responsive to the PRACH preamble received from the UE on the UL resource of the cell in the secondary aggregation group.

2. The method of claim 1, further comprising the steps of:
   broadcasting, to the UE, paging and system information relating to any of the cells in the primary aggregation group of cells on the PCell of the primary aggregation group; and
   broadcasting, to the UE, paging and/or system information relating to any of the cells in the secondary aggregation group of cells on the group PCell of the secondary aggregation group.

3. The method of claim 1, further comprising the steps of:
   receiving, on the UL resources of the PCell of the primary aggregation group, feedback from the UE acknowledging receipt of communications from the network node that used DL resources of any of the cells within the primary aggregation group; and
   receiving, on the UL resources of the group PCell of the secondary aggregation group, feedback from the UE acknowledging receipt of communications from the network node that used DL resources of any of the cells within the secondary aggregation group.

4. The method of claim 3, further comprising the steps of:
   receiving, from the UE, HARQ-ACK feedback for all cells within the primary aggregation group on the UL resources of the PCell of the primary aggregation group; and receiving, from the UE, HARQ-ACK feedback for all cells within the secondary aggregation group on the UL resources of the group PCell of the secondary aggregation group.

5. The method of claim 1, wherein:
the PCell is a first one of the cells assigned to the primary aggregation group with the UL and DL resources for communication with the UE; and
the serving cell is setup as the group PCell in the secondary aggregation group in response to the serving cell being a first cell assigned to the secondary aggregation group with the UL and DL resources for communication with the UE.

6. The method of claim 1, further comprising the steps of:
receiving DL acknowledgement feedback for all cells within the primary aggregation group from the UE on the UL resources of the PCell in the primary aggregation group; and
receiving DL acknowledgement feedback for all cells within the secondary aggregation group from the UE on the UL resources of the group PCell in the secondary aggregation group.

7. The method of claim 1, further comprising the steps of:
determining whether another serving cell for assignment to the UE is to be within the primary aggregation group or within the secondary aggregation group;
based on determining that the another serving cell is to be within the secondary aggregation group, transmitting a configuration message containing aggregation group assignment information, which identifies the secondary aggregation group, to the UE to configure the UE to connect to the another serving cell and monitor the DL resources of the group PCell in the secondary aggregation group for information related to the another serving cell; and
based on determining that the another serving cell is to be within the primary aggregation group, transmitting a configuration message that does not contain aggregation group assignment information to the UE to configure the UE to connect to the another serving cell and monitor the DL resources of the PCell in the primary aggregation group for information related to the another serving cell.

8. The method of claim 7, further comprising the steps of:
based on determining that the another serving cell is to be within the secondary aggregation group, the configuration message is transmitted on the DL resources of the group PCell in the secondary aggregation group; and
based on determining that the another serving cell is to be within the primary aggregation group, the configuration message is transmitted on the DL resources of the PCell in the primary aggregation group.

9. The method of claim 1, further comprising the steps of:
determining that a new group PCell within a new secondary aggregation group is to be assigned to the UE; and
transmitting a configuration message containing aggregation group assignment information, which identifies the new secondary aggregation group and the new group PCell, to the UE to configure the UE to connect to the new group PCell and monitor DL resources of the new group PCell in the new secondary aggregation group for scheduling information for any serving cells in the new secondary aggregation group.

10. The method of claim 1, further comprising the steps of:
detecting threshold interference with communications on the UL and/or DL resources of the group PCell of the secondary aggregation group; and
transmitting, to the UE, a configuration message containing aggregation group assignment information identifying another serving cell in the secondary aggregation group that the UE is to use as a new group PCell for the secondary aggregation group.

11. A method by a user equipment node (UE) that communicates using uplink (UL) and downlink (DL) resources of cells provided by at least one network node, the method comprising the steps of:
monitoring paging and system information broadcast on a primary cell (PCell) of a primary aggregation group of the cells;
monitoring paging and/or system information broadcast on a group PCell of each of one or more secondary aggregation groups of the cells;
receiving a timing advance command on a DL resource of the group PCell in a selected one of the one or more secondary aggregation groups of the cells;
receiving a first command on the PCell in the primary aggregation group;
based on the first command, transmitting a Physical Random Access Channel (PRACH) preamble on a UL resource of a cell in the primary aggregation group;
receiving a timing advance command on a DL resource of the PCell in the primary aggregation group;
receiving a second command on the group PCell in the secondary aggregation group; and
based on the second command, transmitting a PRACH preamble on a UL resource of a cell in the selected one of the one or more secondary aggregation groups of the cells.

12. The method of claim 11, further comprising the steps of:
monitoring paging and system information, which is broadcast by the at least one network node relating to any cells in the primary aggregation group, on the PCell of the primary aggregation group; and
monitoring paging and/or system information, which is broadcast by the at least one network node relating to any cells in a selected one of the one or more secondary aggregation groups, on a group PCell of the selected one of the one or more secondary aggregation groups of the cells.

13. The method of claim 11, further comprising the steps of:
communicating with one of the at least one network node using frequency division duplex (FDD) on UL and DL resources of the primary aggregation group of the cells; and
communicating with the one of the at least one network node using time division duplex (TDD) on UL and DL resources within a selected one of the one or more secondary aggregation groups of the cells.

14. The method of claim 11, further comprising the steps of:
communicating with a first network node using UL and DL resources of the primary aggregation group of the cells; and
communicating with a second network node, that is separate from the first network node, using UL and DL resources within a selected one of the one or more secondary aggregation groups of the cells.

15. The method of claim 11, further comprising the steps of:
transmitting downlink HARQ-ACK feedback for all cells within the primary aggregation group on a UL of the PCell of the primary aggregation group of the cells; and
transmitting downlink HARQ-ACK feedback for all cells within a selected one of the one or more secondary aggregation groups on a UL of the group PCell of the selected one of the one or more secondary aggregation groups of the cells.

16. The method of claim 11, further comprising the steps of:
receiving a configuration message identifying another serving cell assigned to the UE;
determining whether the configuration message contains aggregation group assignment information;
based on the configuration message containing aggregation group assignment information that identifies one of the one or more secondary aggregation groups of the cells, monitoring DL resources of the group PCell of the one or more secondary aggregation groups for information related to the another serving cell; and
based on the configuration message not containing aggregation group assignment information, monitoring DL resources of the PCell of the primary aggregation group for information related to the another serving cell.

17. The method of claim 16, wherein:
the configuration message is received on the DL resources of either the PCell of the primary aggregation group or on the DL resources of the group PCell of one of the one or more secondary aggregation groups.

18. The method of claim 16, further comprising the steps of:
based on determining that the configuration message contains aggregation group assignment information that identifies a new secondary aggregation group of cells that is not an existing one of the one or more secondary aggregation groups of the cells:
using the another serving cell as a group PCell of the new secondary aggregation group of cells; and
monitoring DL resources of the group PCell of the new secondary aggregation group of cells for information relating to any cells within the new secondary aggregation group of cells.

19. The method of claim 11, further comprising the steps of:
receiving a configuration message containing aggregation group assignment information identifying another serving cell in a selected one of the one or more secondary aggregation groups that the UE is to use as a new group PCell for the selected one of the one or more secondary aggregation groups; and
monitoring DL resources of the another serving cell as the new group PCell for scheduling information for any cells within the selected one of the one or more secondary aggregation groups.

20. The method of claim 11, further comprising the steps of:
monitoring DL communications from a network node on different cells within a same one of the one or more secondary aggregation groups of the cells to identify radio link failures of a plurality of the cells; and
initiating searching for the plurality of the cells having the radio link failures responsive to occurrence of a threshold number of the radio link failures.

21. A network node that provides cells serving uplink (UL) and downlink (DL) resources for wireless communications between the network node and a user equipment node (UE), the network node comprising:
at least one processor; and
at least one memory coupled to the at least one processor and comprising computer readable program code that when executed by the at least one processor causes the at least one processor to perform operations comprising:
forming a primary aggregation group of cells that contains a primary cell (PCell);
operating the UL and DL resources of the PCell in the primary aggregation group to communicate with the UE;
configuring the UE to connect to a serving cell;
assigning the serving cell to a secondary aggregation group of cells;
setting up the UL and DL resources of the serving cell as a group PCell in the secondary aggregation group for communication with the UE;
transmitting a timing advance command to the UE on a DL resource of the group PCell in the secondary aggregation group;
transmitting a command to the UE on the PCell in the primary aggregation group to control the UE to transmit a Physical Random Access Channel (PRACH) preamble on a UL resource of a cell in the primary aggregation group;
measuring UL timing responsive to the PRACH preamble received from the UE on the UL resource of the cell in the primary aggregation group;
transmitting a timing advance command to the UE on a DL resource of the PCell in the primary aggregation group;
transmitting a command to the UE on the group PCell in the secondary aggregation group to control the UE to transmit a PRACH preamble on a UL resource of a cell in the secondary aggregation group; and
measuring UL timing responsive to the PRACH preamble received from the UE on the UL resource of the cell in the secondary aggregation group.

22. The network node of claim 21, wherein the operations further comprise:
broadcasting, to the UE, paging and system information relating to any of the cells in the primary aggregation group of cells on the PCell of the primary aggregation group; and
broadcasting, to the UE, paging and/or system information relating to any of the cells in the secondary aggregation group of cells on the group PCell of the secondary aggregation group.

23. The network node of claim 21, wherein the operations further comprise:
receiving, on the UL resources of the PCell of the primary aggregation group, feedback from the UE acknowledging receipt of communications from the network node that used DL resources of any of the cells within the primary aggregation group; and
receiving, on the UL resources of the group PCell of the secondary aggregation group, feedback from the UE acknowledging receipt of communications from the network node that used DL resources of any of the cells within the secondary aggregation group.

24. The network node of claim 21, wherein the operations further comprise:
determining whether another serving cell for assignment to the UE is to be within the primary aggregation group or within the secondary aggregation group;

based on determining that the another serving cell is to be within the secondary aggregation group, transmitting a configuration message containing aggregation group assignment information, which identifies the secondary aggregation group, to the UE to configure the UE to connect to the another serving cell and monitor the DL resources of the group PCell in the secondary aggregation group for information related to the another serving cell; and based on determining that the another serving cell is to be within the primary aggregation group, transmitting a configuration message that does not contain aggregation group assignment information to the UE to configure the UE to connect to the another serving cell and monitor the DL resources of the PCell in the primary aggregation group for information related to the another serving cell.

25. The network node of claim 21, wherein the operations further comprise:
determining that a new group PCell within a new secondary aggregation group is to be assigned to the UE; and
transmitting a configuration message containing aggregation group assignment information, which identifies the new secondary aggregation group and the new group PCell, to the UE to configure the UE to connect to the new group PCell and monitor DL resources of the new group PCell in the new secondary aggregation group for scheduling information for any serving cells in the new secondary aggregation group.

26. A user equipment node (UE) that communicates using uplink (UL) and downlink (DL) resources of cells provided by at least one network node, the UE comprising:
at least one processor; and
at least one memory coupled to the at least one processor and comprising computer readable program code that when executed by the at least one processor causes the at least one processor to perform operations comprising:
monitoring paging and system information broadcast on a primary cell (PCell) of a primary aggregation group of the cells;
monitoring paging and/or system information broadcast on a group PCell of each of one or more secondary aggregation groups of the cells;
receiving a timing advance command on a DL resource of the group PCell in a selected one of the one or more secondary aggregation groups of the cells;
receiving a first command on the PCell in the primary aggregation group;
based on the first command, transmitting a Physical Random Access Channel (PRACH) preamble on a UL resource of a cell in the primary aggregation group;
receiving a timing advance command on a DL resource of the PCell in the primary aggregation group;
receiving a second command on the group PCell in the secondary aggregation group; and
based on the second command, transmitting a PRACH preamble on a UL resource of a cell in the selected one of the one or more secondary aggregation groups of the cells.

27. The UE of claim 26, wherein the operations further comprise:
communicating with one of the at least one network node using frequency division duplex (FDD) on UL and DL resources of the primary aggregation group of the cells; and
communicating with the one of the at least one network node using time division duplex (TDD) on UL and DL resources within a selected one of the one or more secondary aggregation groups of the cells.

28. The UE of claim 26, wherein the operations further comprise:
communicating with a first network node using UL and DL resources of the primary aggregation group of the cells; and
communicating with a second network node, that is separate from the first network node, using UL and DL resources within a selected one of the one or more secondary aggregation groups of the cells.

29. The UE of claim 26, wherein the operations further comprise:
transmitting downlink HARQ-ACK feedback for all cells within the primary aggregation group on a UL of the PCell of the primary aggregation group of the cells; and
transmitting downlink HARQ-ACK feedback for all cells within a selected one of the one or more secondary aggregation groups on a UL of the group PCell of the selected one of the one or more secondary aggregation groups of the cells.

30. The UE of claim 26, wherein the operations further comprise:
receiving a configuration message identifying another serving cell assigned to the UE;
determining whether the configuration message contains aggregation group assignment information;
based on the configuration message containing aggregation group assignment information that identifies one of the one or more secondary aggregation groups of the cells, monitoring DL resources of the group PCell of the one or more secondary aggregation groups for information related to the another serving cell; and
based on the configuration message not containing aggregation group assignment information, monitoring DL resources of the PCell of the primary aggregation group for information related to the another serving cell.

31. The UE of claim 26, wherein the operations further comprise:
receiving a configuration message containing aggregation group assignment information identifying another serving cell in a selected one of the one or more secondary aggregation groups that the UE is to use as a new group PCell for the selected one of the one or more secondary aggregation groups; and
monitoring DL resources of the another serving cell as the new group PCell for scheduling information for any cells within the selected one of the one or more secondary aggregation groups.

32. The UE of claim 26, wherein the operations further comprise:
monitoring DL communications from a network node on different cells within a same one of the one or more secondary aggregation groups of the cells to identify radio link failures of a plurality of the cells; and
initiating searching for the plurality of the cells having the radio link failures responsive to occurrence of a threshold number of the radio link failures.

* * * * *